United States Patent
Wang et al.

(10) Patent No.: US 11,676,074 B2
(45) Date of Patent: Jun. 13, 2023

(54) HETEROGENEOUS PROCESSING SYSTEM FOR FEDERATED LEARNING AND PRIVACY-PRESERVING COMPUTATION

(71) Applicant: CLUSTAR TECHNOLOGY CO., LTD., Guangdong (CN)

(72) Inventors: Wei Wang, Guangdong (CN); Mo Chen, Guangdong (CN)

(73) Assignee: CLUSTAR TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/888,024

(22) Filed: Aug. 15, 2022

(65) Prior Publication Data

US 2023/0088897 A1 Mar. 23, 2023

(30) Foreign Application Priority Data

Sep. 17, 2021 (CN) .......................... 202111094089.9

(51) Int. Cl.
  *G06N 20/00* (2019.01)
  *G06F 9/48* (2006.01)
  *H04L 9/00* (2022.01)

(52) U.S. Cl.
  CPC .......... *G06N 20/00* (2019.01); *G06F 9/4881* (2013.01); *H04L 9/008* (2013.01)

(58) Field of Classification Search
  CPC ........ G06N 20/00; G06F 9/4881; H04L 9/008
  See application file for complete search history.

(56) References Cited

U.S. PATENT DOCUMENTS

| | | | |
|---|---|---|---|
| 2005/0203988 A1 | 9/2005 | Nollet et al. | |
| 2019/0347125 A1* | 11/2019 | Sankaran | G06F 9/383 |
| 2020/0364088 A1* | 11/2020 | Ashwathnarayan | G06F 9/5016 |
| 2022/0321647 A1* | 10/2022 | Berggren | H04W 8/22 |

FOREIGN PATENT DOCUMENTS

| | | |
|---|---|---|
| CN | 106020425 A | 10/2016 |
| CN | 106708777 A | 5/2017 |
| CN | 106933579 A | 7/2017 |
| CN | 111831330 A | 10/2020 |
| CN | 112000598 A | 11/2020 |
| CN | 112346833 A | 2/2021 |
| CN | 112685159 A | 4/2021 |
| CN | 113177211 A | 7/2021 |

OTHER PUBLICATIONS

Chinese Office Action, Application No. 202111094089.9, with English Translation, dated Dec. 10, 2021, 25 pages.

* cited by examiner

*Primary Examiner* — Kenneth Tang
(74) *Attorney, Agent, or Firm* — Rankin, Hill & Clark LLP

(57) ABSTRACT

A heterogeneous processing system for federated learning and privacy-preserving computation, including: a serial subsystem configured for distributing processing tasks and configuration information of processing tasks, the processing task indicating performing an operation corresponding to computing mode on one or more operands; and a parallel subsystem configured for, based on the configuration information, selectively obtaining at least one operand of the one or more operands from an intermediate result section on the parallel subsystem while obtaining remaining operand(s) of the one or more operands with respect to the at least one operand from the serial subsystem, and performing the operation on the operands obtained based on the configuration information.

28 Claims, 4 Drawing Sheets

HETEROGENEOUS PROCESSING SYSTEM FOR FEDERATED LEARNING AND PRIVACY-PRESERVING COMPUTATION

CROSS-REFERENCE TO RELATED APPLICATIONS

The present application claims priority to allowed Chinese patent application Ser. No. CN 202111094089.9, filed on Sep. 17, 2021 which has issued as CN 113553191B on Jan. 4, 2022, the contents of which are incorporated by reference in their entirety.

BACKGROUND

With the development of implementations like artificial intelligence and big data mining analysis, the demand for data volume is increasing. For example, training artificial intelligence models requires the use of large amounts of training data with appropriate data labels or feature values. High-quality data often comes from application data generated and accumulated in business activities. However, application data is often scattered in the hands of different organizations and individuals. For example, transaction data is scattered in various financial institutions, and medical diagnosis data is scattered in various medical institutions. Cross-industry and cross-domain application data is often scattered. For example, social attribute data and e-commerce transaction data in the Internet domain are often controlled by different entities respectively. Given that the importance of data ownership, user privacy and data security are receiving more attention, and also in consideration that laws and regulations are imposing stricter constraints and requirements on data collection and processing, organizations or individuals who control application data are often unwilling to cooperate or lack suitable measures, and therefore it is difficult to make the application data controlled by each other work together. Such dilemma in data sharing and collaboration is known as the phenomenon of data silos. In order to solve the problems of cross-industry and cross-organization data cooperation, especially the key issue of privacy protection and data security, the concept of federated learning (FL) is proposed. Federated learning refers that all participants who own data exchange model-related information in an encrypted way to achieve collaborative optimization of federated learning models without sharing protected private data and not passing their own data to the outside world. Specifically, according to the distribution of data feature space and sample space of training data among different participants, federated learning can be divided into horizontal federated learning with large overlap in data feature space and small overlap in sample space, vertical federated learning with small overlap in data feature space and large overlap in sample space, and federated transfer learning with small overlap in both data feature space and sample space.

In implementational scenarios such as federated learning, privacy-preserving computation, distributed artificial intelligence, etc., a large number of encrypted state operations and large integer bit-width data are required, and cyclic computations, recursive computations, and dependent computations with large data volumes are often involved, therefore bringing huge challenges to storage resources and computing performance. In order for solving these problems, a heterogeneous processing system for federated learning and privacy-preserving computation is needed, which can cope with various complex computations in implementational scenarios such as federated learning, privacy-preserving computation, and distributed artificial intelligence that include cyclic computations, recursive computations, and dependent computations with large data volumes, while having beneficial technical effects of efficient computing, low processing delay and high memory utilization.

SUMMARY

The present disclosure relates to the technical fields of data security and privacy protection, and specifically relates to a heterogeneous processing system for federated learning and privacy-preserving computation.

In accordance with a first aspect of the embodiments of the present disclosure, a heterogeneous processing system, applicable for federated learning and privacy-preserving computation, includes a serial subsystem. The serial subsystem is configured for determining by querying a task status register whether a task launch identifier corresponding to a processing task indicates that the processing task is launched. If the task launch identifier indicates that the processing task is launched then the serial subsystem is prohibited from performing operations related to the processing task, and if the task launch identifier indicates that the processing task is not launched then the serial subsystem distributes the processing task together with configuration information of the processing task and sets the task launch identifier to indicate that the processing task is launched. The processing task indicates performing an operation corresponding to computing mode on one or more operands. The task status register includes the task launch identifier corresponding to the processing task for indicating whether the processing task is launched. The heterogeneous processing system also includes a parallel subsystem. The parallel subsystem is configured for determining by querying the task status register whether the task launch identifier corresponding to the processing task indicates that the processing task is launched. If the task launch identifier indicates that the processing task is launched then the parallel subsystem performs the operation corresponding to the computing mode on the one or more operands so as to obtain result data of the processing task. The heterogeneous processing system also includes the task status register. The parallel subsystem is further configured for: based on the configuration information, selectively obtaining at least one operand of the one or more operands from an intermediate result section on the parallel subsystem while obtaining remaining operand(s) of the one or more operands with respect to the at least one operand from the serial subsystem, and performing the operation corresponding to the computing mode on the operands obtained based on the configuration information.

With reference to the first aspect of the embodiments of the present disclosure, in one or more embodiments, the parallel subsystem is further configured for: based on the configuration information, selectively writing the result data into the intermediate result section as an operand of another processing task with respect to the processing task.

With reference to the first aspect of the embodiments of the present disclosure, in one or more embodiments, the parallel subsystem is further configured for: based on the configuration information, selectively writing the result data into a final result section on the parallel subsystem such that the result data is uploadable to the serial subsystem.

With reference to the first aspect of the embodiments of the present disclosure, in one or more embodiments, a memory of the parallel subsystem includes a task distribution section, the intermediate result section, and the final result section, and the serial subsystem is configured for distributing the processing task and the configuration information to the task distribution section.

With reference to the first aspect of the embodiments of the present disclosure, in one or more embodiments, the task distribution section, the intermediate result section, and the final result section each includes a plurality of task blocks respectively. A plurality of processing tasks are in one-to-one correspondence with the plurality of task blocks of the task distribution section. The plurality of processing tasks are in one-to-one correspondence with the plurality of task blocks of the intermediate result section. The plurality of processing tasks are in one-to-one correspondence with the plurality of task blocks of the final result section. For each processing task of the plurality of processing tasks respectively: the serial subsystem is configured for distributing the processing task and the configuration information of the processing task to the task block of the task distribution section that corresponds to the processing task.

With reference to the first aspect of the embodiments of the present disclosure, in one or more embodiments, for each processing task of the plurality of processing tasks respectively: the parallel subsystem is further configured for, based on the configuration information of the processing task, selectively obtaining at least one operand of the operands indicated by the processing task from the task block of the intermediate result section that corresponds to the processing task while obtaining remaining operand(s) of the operands indicated by the processing task from the task block of the task distribution section that corresponds to the processing task, and performing the operation corresponding to the computing mode indicated by the processing task on the operands obtained based on the configuration information of the processing task.

With reference to the first aspect of the embodiments of the present disclosure, in one or more embodiments, for each processing task of the plurality of processing tasks respectively: the parallel subsystem is further configured for, based on the configuration information of the processing task, selectively writing the result data of the processing task into another task block of the intermediate result section as an operand of another processing task with respect to the processing task, the another task block being different from the task block of the intermediate result section that corresponds to the processing task.

With reference to the first aspect of the embodiments of the present disclosure, in one or more embodiments, for each processing task of the plurality of processing tasks respectively: the parallel subsystem is further configured for, based on the configuration information of the processing task, selectively writing the result data of the processing task into the task block of the final result section that corresponds to the processing task such that the result data of the processing task is uploadable to the serial subsystem.

With reference to the first aspect of the embodiments of the present disclosure, in one or more embodiments, the task distribution section, the intermediate result section, and the final result section each has a same first configuration parameter and a same second configuration parameter, the first configuration parameter being a maximum physical memory space occupied by a task block, the second configuration parameter being a maximum number of task blocks.

With reference to the first aspect of the embodiments of the present disclosure, in one or more embodiments, the computing mode is one preset computing mode of a plurality of preset computing modes, the plurality of preset computing modes including modular exponentiation calculation, modular multiplication calculation, RSA intersection calculation, homomorphic encryption, homomorphic decryption, DH key exchange, encrypted state addition, encrypted state multiplication, encrypted state multiplication and addition, matrix multiplication, encrypted data summation.

With reference to the first aspect of the embodiments of the present disclosure, in one or more embodiments, the configuration information includes a plurality of control fields, the plurality of control fields at least including an operand count field, an operand source identifier field, and an operand data address information filed. The parallel subsystem is further configured for: determining, based on the operand count field, a number of the one or more operands; and for each operand of the one or more operands respectively, determining based on the operand source identifier field whether the operand is from the intermediate result section, and if yes, then based on the operand data address information filed obtaining the operand from the intermediate result section.

With reference to the first aspect of the embodiments of the present disclosure, in one or more embodiments, the plurality of control fields also include a computing result storage identifier field. The parallel subsystem determines, based on the computing result storage identifier field, the result data is fit for uploadable to the serial system. The plurality of control fields also include at least one of: a task serial number field, a computing mode field, a task batch number field, a task batch total count field, a parameter number field, a parameter width field, an operand width field, an operand data total length field.

With reference to the first aspect of the embodiments of the present disclosure, in one or more embodiments, the plurality of control fields also include a user-customized field, the user-customized field is for adjusting data interaction between the serial subsystem and the parallel subsystem.

With reference to the first aspect of the embodiments of the present disclosure, in one or more embodiments, the intermediate result section and the final result section each includes inspection information respectively for verifying the configuration information distributed to the task distribution section.

With reference to the first aspect of the embodiments of the present disclosure, in one or more embodiments, the heterogeneous processing system also include: a task address configuration register. The task address configuration register includes: a task source data start address configuration register specification, for identifying the plurality of task blocks of the task distribution section in one-to-one correspondence with the plurality of processing tasks; a task intermediate result data start address configuration register specification, for identifying the plurality of task blocks of the intermediate result section in one-to-one correspondence with the plurality of processing tasks; a task final result data start address configuration register specification, for identifying the plurality of task blocks of the final result section in one-to-one correspondence with the plurality of processing tasks.

With reference to the first aspect of the embodiments of the present disclosure, in one or more embodiments, data interaction between the serial subsystem and the parallel subsystem is based on the task address configuration register. The serial subsystem is configured for, based on the available resources of the parallel subsystem or the processing capabilities of the parallel subsystem, adjusting the task address configuration register.

With reference to the first aspect of the embodiments of the present disclosure, in one or more embodiments, the task status register includes a plurality of records. The plurality of records of the task status register are in one-to-one correspondence with the plurality of processing tasks. The serial subsystem and the parallel subsystem each is configured for, based on the plurality of records of the task status register, applying state control to the plurality of processing tasks respectively.

With reference to the first aspect of the embodiments of the present disclosure, in one or more embodiments, for each processing task of the plurality of processing tasks respectively, the record of the plurality of records of the task status register corresponding to the processing task includes: a task launch identifier, for indicating whether the processing task is launched; a computing engine operational status identifier, for indicating operational status of a computing engine of the parallel subsystem used for the processing task; and a task processing error identifier, for indicating an error type of the processing task.

With reference to the first aspect of the embodiments of the present disclosure, in one or more embodiments, the serial subsystem and the parallel subsystem each is configured for, based on the plurality of records of the task status register, applying state control to the plurality of processing tasks respectively, includes: for each processing task of the plurality of processing tasks respectively, the serial subsystem by querying the task status register determines whether the task launch identifier of the record of the plurality of records of the task status register corresponding to the processing task indicates that the processing task is launched, if yes then the serial subsystem is prohibited from performing operations related to the processing task; for each processing task of the plurality of processing tasks respectively, the parallel subsystem by querying the task status register determines whether the task launch identifier of the record of the plurality of records of the task status register corresponding to the processing task indicates that the processing task is launched, if yes then the parallel system is allowed for performing operations related to the processing task.

With reference to the first aspect of the embodiments of the present disclosure, in one or more embodiments, the heterogeneous processing system also includes: a task result register. The task result register includes a plurality of records. The plurality of records of the task result register are in one-to-one correspondence with the plurality of processing tasks. For each processing task of the plurality of processing tasks respectively, the record of the plurality of records of the task result register corresponding to the processing task includes a task processing result identifier. The task processing result identifier is for indicating whether the processing task has a completion of computing. The task processing result identifier can be adjusted by the parallel subsystem only to the completion of computing, the serial subsystem by querying the task status register determines the processing result of the processing task.

In accordance with a second aspect of the embodiments of the present disclosure, a heterogeneous processing system includes a CPU. The CPU is configured for distributing a plurality of processing tasks together with configuration information of each of the plurality of processing tasks respectively. Each of the plurality of processing tasks indicates performing an operation corresponding to computing mode on one or more operands. The heterogeneous processing system also includes a FPGA. The FPGA includes a parallel computing engine. The parallel computing engine includes a plurality of secondary computing engine in parallel. The FPGA is configured for using the parallel computing engine to perform parallel computing for the plurality of processing tasks. The heterogeneous processing system also includes a task status register. The task status register includes a plurality of records. The plurality of records of the task status register are in one-to-one correspondence with the plurality of processing tasks. The CPU and the FPGA each is configured for, based on the plurality of records of the task status register, applying state control to the plurality of processing tasks respectively. The FPGA includes a task distribution section, an intermediate result section, and a final result section. The task distribution section, the intermediate result section, and the final result section each includes a plurality of task blocks that are in one-to-one correspondence with the plurality of processing tasks respectively. For each processing task of the plurality of processing tasks respectively: the record of the plurality of records of the task status register corresponding to the processing task includes a task launch identifier, for indicating whether the processing task is launched. The CPU is configured for, determining by querying the task status register whether the task launch identifier of the record of the plurality of records of the task status register corresponding to the processing task indicates that the processing task is launched, if the task launch identifier indicates that the processing task is launched then the CPU is prohibited from performing operations related to the processing task, and if the task launch identifier indicates that the processing task is not launched then the CPU distributes the processing task together with configuration information of the processing task to the task block of the task distribution section corresponding to the process task and sets the task launch identifier of the record of the plurality of records of the task status register to indicate that the processing task is launched. The FPGA is configured for, determining by querying the task status register whether the task launch identifier of the record of the plurality of records of the task status register corresponding to the processing task indicates that the processing task is launched, if the task launch identifier indicates that the processing task is launched then the FPGA is further configured for, based on the configuration information of the processing task, selectively obtaining at least one operand of the operands indicated by the processing task from the task block of the intermediate result section that corresponds to the processing task while obtaining remaining operand(s) of the operands indicated by the processing task from the task block of the task distribution section that corresponds to the processing task, and performing the operation corresponding to the processing task on the operands obtained based on the configuration information of the processing task.

With reference to the second aspect of the embodiments of the present disclosure, in one or more embodiments, for each processing task of the plurality of processing tasks respectively, the FPGA is further configured for, based on the configuration information of the processing task, selectively writing the result data of the processing task as an operand of another processing task with respect to the processing task into another task block different from the task block of the intermediate result section corresponding to the processing task.

With reference to the second aspect of the embodiments of the present disclosure, in one or more embodiments, for each processing task of the plurality of processing tasks respectively, the FPGA is further configured for, based on the configuration information of the processing task, selectively writing the result data of the processing task into the task block of the final result section corresponding to the processing task such that the result data of the processing task is uploadable to the CPU.

With reference to the second aspect of the embodiments of the present disclosure, in one or more embodiments, the configuration information of each processing task of the plurality of processing tasks includes a plurality of control fields. For each processing task of the plurality of processing tasks respectively, the plurality of control fields of the configuration information of the processing task at least includes an operand count field, an operand source identifier field, and an operand data address information filed. The FPGA is further configured for: determining, based on the operand count field, a number of the operands indicated by the processing task; and for each operand of the operands indicated by the processing task respectively, determining based on the operand source identifier field whether the operand is from the intermediate result section, and if yes, then based on the operand data address information filed obtaining the operand from the intermediate result section.

With reference to the second aspect of the embodiments of the present disclosure, in one or more embodiments, the intermediate result section and the final result section each includes inspection information respectively for verifying the configuration information of each processing task of the plurality of processing tasks distributed to the task distribution section.

With reference to the second aspect of the embodiments of the present disclosure, in one or more embodiments, the heterogeneous processing system also includes: a task address configuration register. The task address configuration register includes: a task source data start address configuration register specification, for identifying the plurality of task blocks of the task distribution section in one-to-one correspondence with the plurality of processing tasks; a task intermediate result data start address configuration register specification, for identifying the plurality of task blocks of the intermediate result section in one-to-one correspondence with the plurality of processing tasks; and a task final result data start address configuration register specification, for identifying the plurality of task blocks of the final result section in one-to-one correspondence with the plurality of processing tasks.

With reference to the second aspect of the embodiments of the present disclosure, in one or more embodiments, data interaction between the CPU and the FPGA is based on the task address configuration register, the CPU is configured for, based on the available resources of the FPGA or the processing capabilities of the FPGA, adjusting the task address configuration register.

With reference to the second aspect of the embodiments of the present disclosure, in one or more embodiments, for each processing task of the plurality of processing tasks respectively, the record of the plurality of records of the task status register corresponding to the processing task includes: a computing engine operational status identifier, for indicating operational status of a secondary computing engine of the FPGA used for the processing task; and a task processing error identifier, for indicating an error type of the processing task.

With reference to the second aspect of the embodiments of the present disclosure, in one or more embodiments, the heterogeneous processing system also includes: a task result register. The task result register includes a plurality of records. The plurality of records of the task result register are in one-to-one correspondence with the plurality of processing tasks, for each processing task of the plurality of processing tasks respectively. The record of the plurality of records of the task result register corresponding to the processing task includes a task processing result identifier. The task processing result identifier is for indicating whether the processing task has a completion of computing. The task processing result identifier can be adjusted by the FPGA only to the completion of computing. The CPU by querying the task status register determines the processing result of the processing task.

BRIEF DESCRIPTION OF THE DRAWINGS

The drawings are provided to illustrate example embodiments described herein and are not intended to limit the scope of the present disclosure.

DETAILED DESCRIPTION

In order to solve the problems in dealing with various complex computations in implementational scenarios such as federated learning, privacy-preserving computation, and distributed artificial intelligence that include cyclic computations, recursive computations, and dependent computations with large data volumes, one or more embodiments of the present disclosure provide a heterogeneous processing system for federated learning and privacy-preserving computation. As discussed further below, the data transmission problem among multiple processing tasks obtained by expanding the algorithms of federated learning and privacy-preserving computation as well as the cross-platform and cross-system data interaction problem are improved, thereby avoiding a waste of memory resources, a waste of processing capabilities, and a waste of input and output capabilities, while having the advantages of efficient computing, low processing latency, and high memory utilization.

Embodiments of the present disclosure may be applied to various implementation scenarios, including but not limited to, multi-party secure computation (MPC), machine learning model training related to federated learning, data security, privacy protection, or other implementation scenarios where privacy-preserving computation frameworks or algorithms are applied.

The embodiments of the present disclosure can be adjusted and improved according to specific implementation scenarios or application environments, and are not specifically limited here.

In order for those skilled in the art better understanding the present disclosure, the embodiments of the present disclosure will be described below with reference to the drawings of the present disclosure.

Figure 1:
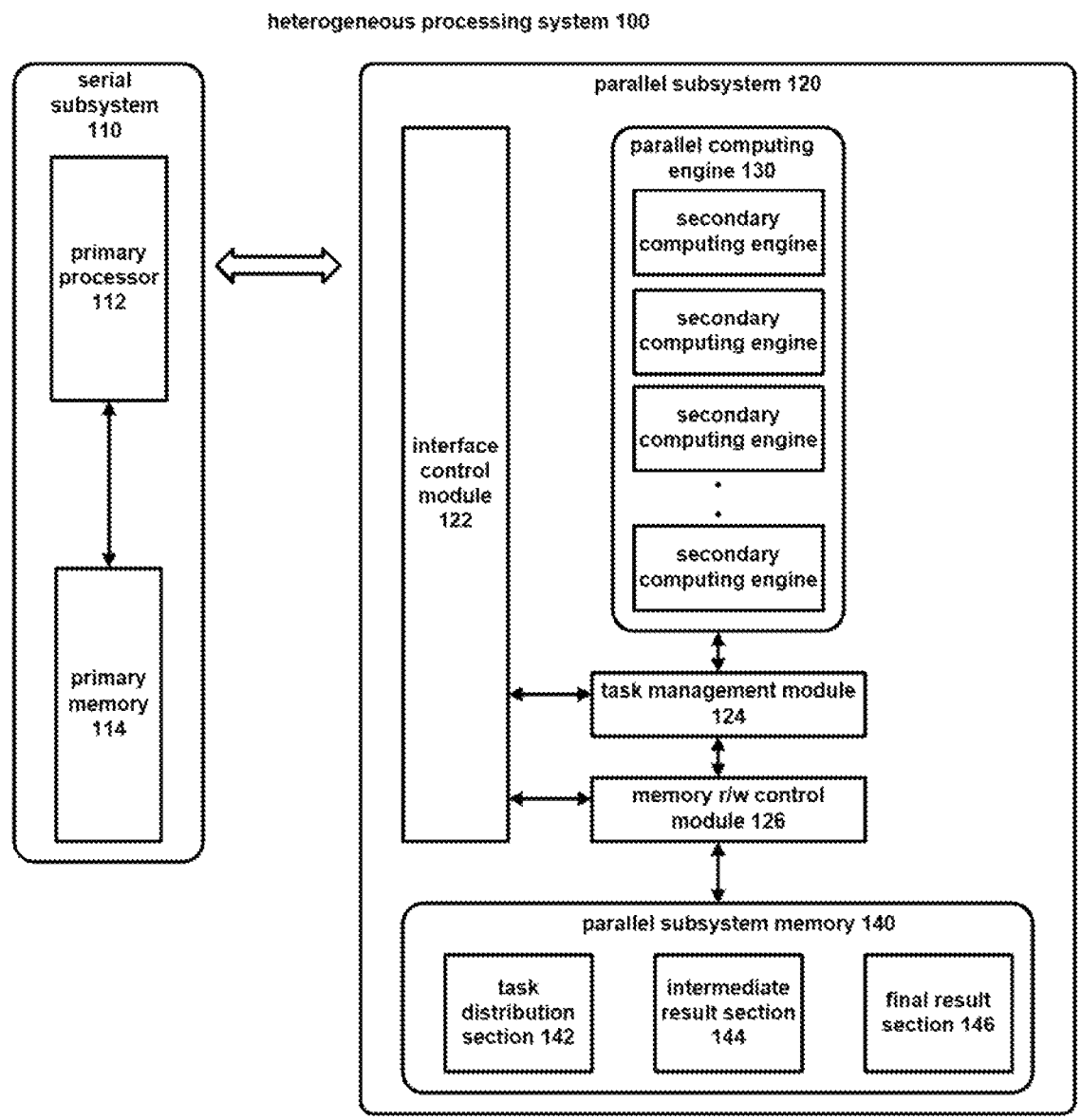
FIG. 1 is a block diagram illustrating a heterogeneous processing system in accordance with one or more embodiments of the present disclosure.

Referring to FIG. 1, FIG. 1 is a block diagram illustrating a heterogeneous processing system in accordance with one or more embodiments of the present disclosure. The heterogeneous processing system 100 of FIG. 1 includes a serial subsystem 110 and a parallel subsystem 120. The serial subsystem 110 is mainly based on serial computing, such as a central processing unit (CPU) or a similar processor based on an instruction set control system. The parallel subsystem 120 is mainly based on parallel computing, such as a field programmable gate array (FPGA) or similar processing device optimized for parallel computing. In application scenarios such as federated learning, privacy-preserving computation, and distributed artificial intelligence, the serial subsystem 110 is used to divide complex algorithms into multiple processing tasks that are suitable for acceleration through parallel computing, and distributes these processing tasks to the parallel subsystem 120, then the parallel subsystem 120 processes and uploads the processing result to the serial subsystem 110. This way, the parallel subsystem 120 utilizes the features of high parallelization, low processing delay and flexible configuration, while the serial subsystem 110 utilizes the features of systematic control and handling of complicated application scenarios. Also, the processing tasks distributed by the serial subsystem 110 to the parallel subsystem 120 are time sequential (i.e., some processing tasks are distributed earlier than other processing tasks), and the processing results of the processing tasks distributed earlier may be used as input data of the processing tasks distributed later, which may appear in application scenarios involving cyclic computations, recursive computations, and dependent computations with large data volumes, etc. Due to limited computing resources, it is generally difficult for the parallel subsystem 120 to process all processing tasks at one time. For the processing results of the processing tasks distributed earlier, if the processing results of these processing tasks are uploaded to the serial subsystem 110 through the parallel subsystem 120 and then sent to the parallel subsystem 120 by the serial subsystem 110 as the input data of the processing tasks distributed later, then it will cause the data to be uploaded from the parallel subsystem 120 to the serial subsystem 110 and then sent to the parallel subsystem 120 by the serial subsystem 110, thereby having a negative impact on resources and efficiency. In addition, the data also needs to go through the writing operations and reading and writing operations in the primary memory 114 by the primary processor 112 of the serial subsystem 110, and the reading and writing operations between the primary processor 112 of the serial subsystem 110 and the primary memory 114 will increase the delay, also bringing a waste of memory resources, a waste of processing capabilities, and a waste of input and output capabilities. In order to avoid a waste of memory resources, a waste of processing capabilities, and a waste of input and output capabilities as mentioned above, also to avoid the negative impact caused by uploading the data from the parallel subsystem 120 to the serial subsystem 110 and then distributing the data to the parallel subsystem 120 by the serial subsystem 110, the heterogeneous processing system 100 provides improvements in the data interaction between the serial subsystem 110 and the parallel subsystem 120 and improvements in the parallel subsystem memory 140, which are described in detail below.

It is noted that in similar application scenarios such as cyclic computations, recursive computations, and dependent computations with large data volumes, there might be situations where perform multiple iterative computations need to be performed on an iterative computation part composed of several steps, and the computation results of preceding steps might be the input data for latter steps. By analyzing the algorithms related to federated learning and privacy-preserving computation, one can expand them into a combination of multiple computing modes. Each computing mode can be represented as a calculation formula for performing specific operations to one, two, three or more operands. The above-mentioned iterative computation part can also be expanded into a loop computation that has specific iterative termination conditions and is composed of several computing modes. The following takes the Paillier decryption algorithm as an example to illustrate how to expand into a combination of multiple computing modes. Please refer to the following formulas (1) to (8).

$$\text{public key pair}(N, N^2); \text{private key pair}(\lambda, \mu) \quad (1)$$

$$m = L(C^\lambda \bmod N^2) \cdot \mu \bmod N \quad (2)$$

$$L(x) = \frac{x-1}{N} \quad (3)$$

$$m = \frac{C^\lambda \bmod N^2 - 1}{N} \cdot \mu \bmod N \quad (4)$$

$$R1 = C^\lambda \bmod N^2 \quad (5)$$

$$R2 = R1 - 1 \quad (6)$$

$$R3 = \frac{R2}{N} \quad (7)$$

$$R4 = R3 \cdot \mu \bmod N \quad (8)$$

The above formula (1) represents the respective parameters of the public key pair and the private key pair, where N itself and the quadratic power of N are the modulus in the modulo operation as well as the public key. Also, the private key pair ($\lambda$, $\mu$) is the key generated during the Paillier encryption and used for subsequent decryption. Formula (2) is the mathematical expression of the unexpanded Paillier decryption, where C is the encrypted state data, i.e., the ciphertext obtained after encryption, and m is the plaintext obtained after decryption. Formula (3) is the expression of the function L(x) in formula (2), and formula (4) is obtained by inserting formula (3) into formula (2) and expanding. Formula (4) is the mathematical expression of the expanded Paillier decryption. It can be seen from formula (4) that for each ciphertext C, the public key pair in formula (1) is N itself and the quadratic power of N, and according to the private key pair ($\lambda$, $\mu$) one can perform a specific operation to get the plaintext m. Also, formula (4) indicates that there are two modulo operations, one is taking the square of N as the modulus, and the other is taking N as the modulus. Moreover, formulas (1) to (4) show that for multiple ciphertexts in the same batch or multiple input data in the same batch, the same public key pair and private key pair are applicable, which means the same parameters are applicable. Therefore, every time there is a new input data, i.e., a new ciphertext C, the parameters in formula (4) can be kept unchanged, and the result obtained by performing a specific operation according to formula (4) is plaintext m.

The expanded mathematical expression of Paillier decryption shown in formula (4) can be further expanded into a combination of multiple computing modes from formula (5) to formula (8). Specifically, one may first calculate R1 according to formula (5), formula (5) means performing modular exponentiation calculation, where the ciphertext data C is the power base, the private key λ is the power exponent, mod represents the modulo operation, and the square of N is the public key and the modulus. Formula (6) means performing the operation of subtracting a positive integer 1 from R1, and the result of the subtraction operation is R2. Formula (7) means performing the division operation on R2, where the divisor is the public key N and the result of the division operation is R3. Formula (8) means performing a modular multiplication calculation operation, where the result of the division operation R3 and the private key µ are two parameters used for the modular multiplication calculation, and the public key N is the modulus. Using the principle of Montgomery modular multiplication, the modular exponentiation calculation of formula (8) can be transformed into first applying montgomerization to R3 and the private key µ, and then obtaining the obfuscation operation result through the obfuscation operation in the Montgomery domain, and finally applying montgomery reduction to the obfuscation operation result, so as to obtain the result of the modular multiplication calculation operation of formula (8), i.e., the Paillier decryption result of formula (4) as well as the plaintext data m. It should be understood that the expanded mathematical expression of Paillier decryption shown in formula (4) is further expanded and divided into multiple steps in sequence, which are respectively represented by formula (5) to formula (8). In other words, for multiple ciphertexts of the same batch or multiple input data of the same batch, if the same public key pair and private key pair are used, which means the same parameters are used, then for each ciphertext data C one may execute the corresponding computing modes of formula (5) to formula (8) one by one. Moreover, the computing modes corresponding to each of the formulas (5) to (8) may be expressed as calculation formulas for performing specific operations on one, two, three or more operands. For example, formula (5) uses the ciphertext C as the operand to perform the modulo operation, and formula (6) uses the result R1 of formula (5) as the operand to perform the operation of subtracting the positive integer 1, which is collectively referred to as the subtraction operation below. Formula (7) uses the result R2 of formula (6) as the operand to perform the division operation, and formula (8) uses the result of formula (7) as the operand to perform the modular multiplication calculation.

Taking the above Paillier decryption algorithm as an example, by analyzing the algorithms related to federated learning and privacy-preserving computation, the algorithms can be expanded into a combination of multiple computing modes, where each computing mode performs a specific operation on one or more operands. Here, the operand of each computing mode can be the result of other computing modes or new input data such as new ciphertext. For example, the following algorithms can be analyzed and expanded into a combination of multiple computing modes: Intersection Algorithm, Vertical Safe Gradient Boosting Tree Algorithm, Vertical Logistic Regression Algorithm, Local Sklearn Logistic Regression Algorithm, Vertical Linear Regression Algorithm, Vertical Poisson Regression Algorithm, Horizontal Logistic Regression Algorithm, Horizontal Neural Network Algorithm, Vertical Fast Safe Gradient Boosting Tree Algorithm, Vertical Safe Gradient Boosting Tree Feature Coding Algorithm, Vertical Neural Network Algorithm, Horizontal Safe Gradient Boosting Tree Algorithm, Vertical Federated Transfer Learning Algorithm, Vertical K-Means Algorithm, Feldman Safe Sum Algorithm. For algorithms containing an iterative computation part, such as cyclic computations, recursive computations, and dependent computations with large data volumes, etc., the iterative computation part can also be expanded into several computing modes for cyclic computation. In this way, various complex calculations in application scenarios such as federated learning, privacy-preserving computation, and distributed artificial intelligence can be analyzed and expanded into multiple computing modes. And, as shown in formulas (5) to (8) obtained by expanding the Paillier decryption algorithm above, the result of one computing mode can be used as the input data of the other computing mode. In addition, multiple input data in the same batch, such as multiple ciphertexts in the same batch using the Paillier decryption algorithm, apply the same parameters, which means that the same computing mode needs to perform multiple operations to the input data, and each operation keeps the parameters unchanged but only changes the operands. For example, the computing mode corresponding to formula (5) needs to perform a modulo operation on each ciphertext as an operand for multiple ciphertexts in the same batch. The computing mode corresponding to formula (6) also needs to use each input data in the same batch of multiple input data as an operand to perform a subtraction operation, and the input data or operand of the computing mode corresponding to formula (6) comes from the output result of the computing mode corresponding to formula (5). Above formulas (5) to (8) only reflect the case of a single operand. Assuming that a federated learning algorithm is a combination of multiple computing modes and each computing mode includes at least two operands, then each computing mode needs to perform multiple operations on the same batch of input data, and each operation maintains the parameters unchanged while only changing the at least two operands. Similarly, the methods of analyzing and expanding algorithms related to federated learning and privacy-preserving computation can be applied to computing modes that include three or more operands. It should be understood that for the same batch of data, in relevant application scenarios of federated learning and privacy-preserving computation, the same parameters can be applied, such as the modulus determined based on the key, etc., therefore, the same computing mode can be used under the presumption of keeping the parameters unchanged and the operand is only changed according to the input data, so as to complete the operation on the input data of the same batch.

In application scenarios such as federated learning, privacy-preserving computation, distributed artificial intelligence, etc., a large number of encrypted state operations and large integer bit-width data are required, and often involving cyclic computations, recursive computations, and dependent computations with large data volumes, etc., which include iterative calculation parts. These iterative calculation parts can be expanded into computing modes including one or more operands like the non-iterative calculation parts, and the result of one computing mode can be used as input data of another computing mode. By performing multiple iterative calculations on several computing modes constituting the iterative calculation part in a specific order, the corresponding iterative calculation part can be completed. In practical applications, the work of analyzing and expanding related algorithms of federated learning and privacy-preserving computation is generally implemented by hardware suitable for complex operations and system control, such as serial subsystem 110 shown in FIG. 1. Various computing modes, that are obtained by analyzing and expansion, because they themselves can be expressed as a calculation formula for performing specific operations on one, two, three or more operands, are therefore suitable for acceleration through parallel processing, such as through the parallel subsystem 120 shown in FIG. 1. Specifically, the serial subsystem 110 analyzes and expands the algorithms related to federated learning and privacy-preserving computation. For example, the primary processor 112 analyzes and expands the Paillier decryption algorithm shown in the above formula (4), thereby obtaining multiple processing tasks; each processing task corresponds to a computing mode, and each computing mode can be expressed as a calculation formula for performing a specific operation on one, two, three or more operands, such as the above formula (5) to formula (8). The serial subsystem 110 distributes multiple processing tasks to the parallel subsystem 120. Considering that the result of one processing task can be used as the input data of another processing task, for example, the input data of the computing mode corresponding to formula (6) as well as the corresponding processing task come from the result of the computing mode corresponding to formula (5) as well as the corresponding processing task. In order to avoid the negative effects such as delay and reading and writing operations caused by the uploading of the data from the parallel subsystem 120 to the serial subsystem 110 and then distributing by the serial subsystem 110 to the parallel subsystem 120, the following describes improvements in data transaction between the serial subsystem 110 and the parallel subsystem 120 and improvements in parallel subsystem memory 140 in detail with reference to FIG. 1.

Still referring to FIG. 1, as described above, the serial subsystem 110 includes a primary processor 112 and a primary memory 114, and the serial subsystem 110 analyzes and expands the related algorithms of federated learning and privacy-preserving computation to obtain multiple processing tasks. Each processing task corresponds to a computing mode, and each computing mode can represent a calculation formula that performs specific operations on one, two, three or more operands. The primary processor 112 may include one or more CPUs, and each CPU may provide processing tasks individually or together. The primary processor 112 may also include other processors or integrated circuits suitable for serial computing to provide processing tasks. The serial subsystem 110 distributes multiple processing tasks to the parallel subsystem 120. The parallel subsystem 120 includes an interface control module 122, and the interface control module 122 is used for data interaction and communication functions between the serial subsystem 110 and the parallel subsystem 120, including receiving the processing task distributed from the serial subsystem 110 to the parallel subsystem 120 and uploading the result data of the parallel subsystem 120 to serial subsystem 110. The interface control module 122 can use a high-speed communication interface, for example, a peripheral component interconnect express (PCIE) interface. The parallel subsystem 120 also includes a parallel computing engine 130. The parallel computing engine 130 includes a plurality of secondary computing engines, and the plurality of secondary computing engines are independent from each other and can be used to process computing tasks in parallel. The parallel computing engine 130 can process multiple computing tasks in parallel, where one secondary computing engine can be arranged to process one computing task, or multiple secondary computing engines can be arranged to process the same computing task. The multiple processing tasks distributed from the serial subsystem 110 to the parallel subsystem 120, and the operations within them, such as the operations shown in the above formulas (5) to (8), can be completed by the parallel computing engine 130 as computing tasks. A processing task can be treated as a computing task or as multiple computing tasks. A processing task can be completed by one secondary computing engine or by multiple secondary computing engines. In other words, a computing mode can be regarded as one computing task or multiple computing tasks, and a computing mode can be completed by one secondary computing engine or by multiple secondary computing engines. In a word, the parallel computing engine 130 can use any suitable parallel processing technology and data distribution technology to complete multiple processing tasks distributed from the serial subsystem 110 to the parallel subsystem 120 through the included multiple secondary computing engines. Multiple secondary computing engines may have the same structure and function, or may have different structures and functions; may have the same data processing bit width or different data processing bit widths; may have the same or different data path designs.

It is noted that, the data interaction between the serial subsystem 110 and the parallel subsystem 120 included in the heterogeneous processing system 100 shown in FIG. 1 is within the domain of heterogeneous calculation or heterogeneous computing. Here, heterogeneous calculation, which is also referred to as heterogeneous computing, refers to the manner in which a system is formed by computing units of different types of instruction sets or different architectures in a general sense. The serial subsystem 110 is mainly based on serial computing, such as a CPU, and the parallel subsystem 120 is mainly based on parallel computing, such as an FPGA. Any other suitable architecture or processor technology can also be used to construct or supplement the serial subsystem 110 or parallel subsystem 120, including but not limited to, Application-Specific Integrated Circuit (ASIC), Coarse-grained Reconfigurable Architecture (CGRA), Digital Signal Processing (DSP). As long as the serial subsystem 110 is used for serial computing and the parallel subsystem 120 is used for parallel computing, and applicable to achieve improvements in data interaction between serial subsystem 110 and parallel subsystem 120 and improvements in parallel subsystem memory 140, any suitable processors or computing units may be used to compose, supplement, or replace in part or in whole serial subsystem 110 or parallel subsystem 120, and these processors or computing units may be consistent or inconsistent with respect to: instruction set, instruction architecture, hardware architecture, control flow, data flow, reconfigurability, especially dynamic reconfigurability, and any other suitable metric or feature. Also, the present disclosure is intended to include metrics or features as well as processor technology or integrated circuit hardware architecture suitable for serial computing or parallel computing, which may become covered by relevant understanding of the concept of heterogeneous computing as the concept of heterogeneous computing evolves after the present disclosure is filed or published.

Still referring to FIG. 1, the parallel subsystem 120 also includes a task management module 124, and the task management module 124 is used for scheduling, responding, processing, and managing the processing tasks distributed from the serial subsystem 110 to the parallel subsystem 120, and is also used for sending the data to be processed and the processing tasks to the parallel computing engine 130 for calculation, also is used to receive the results of the parallel computing engine 130. The task management module 124 is communicatively connected to the interface control module 122, and is also communicatively connected to the parallel computing engine 130, and is also communicatively connected to the memory r/w control module 126. The memory r/w control module 126 is connected in communication with the parallel subsystem memory 140, and the memory r/w control module 126 is used to perform reading and writing operations on different sections of the parallel subsystem memory 140. The task management module 124 acquires the data and parameters to be calculated through the memory r/w control module 126, writes the result of the parallel computing engine 130 into the parallel subsystem memory 140, and reads the result stored in the parallel subsystem memory 140. It should be understood that the respective functions of the task management module 124 and the memory r/w control module 126 can be recombined or divided, and can be implemented by a single integrated chip or separately, and can be implemented by hardware, software, firmware, solid-state logic or combination of them, and may be implemented in conjunction with signal processing, control, and/or special purpose circuits. The devices or apparatus provided by specific embodiments of the present disclosure may include one or more processors (e.g., microprocessors, controllers, digital signal processors (DSPs), application specific integrated circuits (ASICs), field programmable gate arrays (FPGA), etc.), these processors process various computer-executable instructions to control the operation of a device or apparatus. The devices or apparatus provided by specific embodiments of the present disclosure may include a system bus or a data transmission system that couples various components together. A system bus may include any one or a combination of different bus structures, such as a memory bus or memory controller, a peripheral bus, a universal serial bus, and/or processing utilizing any of a variety of bus architectures device or local bus. The devices or apparatuses provided by the specific embodiments of the present disclosure may be provided independently, may be part of a system, or may be a part of other devices or apparatuses. It should be understood that the parallel subsystem memory 140 and sections included may be a part of the parallel subsystem 120, for example, when the parallel subsystem 120 is an FPGA, the parallel subsystem memory 140 is a part used for data storage on the FPGA; alternatively, the parallel subsystem memory 140 can be provided separately but located on the side of the parallel subsystem 120, for example, it belongs to the same hardware platform as the parallel subsystem 120 or on a local memory relative to the parallel subsystem 120. This way, one may enable the parallel subsystem 120 to access the parallel subsystem memory 140 to meet high-speed access requirements, such as accessing local memory or memory on the same hardware platform or the same FPGA.

Still referring to FIG. 1, the parallel subsystem memory 140 performs section division and configuration, thereby obtaining three sections, which are the task distribution section 142, the intermediate result section 144 and the final result section 146 respectively. Among them, the task distribution section 142 includes a plurality of task blocks (also referred to as "Task Section"), and each task block corresponds to a processing task. The serial subsystem 110 can deliver multiple processing tasks to the parallel subsystem 120 at one time or within a certain period of time, and each of the delivered multiple processing tasks is delivered to one task block among the multiple task blocks in the task distribution section 142. The maximum number of tasks that the parallel subsystem 120 can process at the same time is determined according to the number of task blocks included in the task distribution section 142. For example, the task distribution section 142 has 16 task blocks, and the maximum number of tasks that parallel subsystem 120 can process at the same time is 16. The size of each task block, that is, the size of the actual physical memory space occupied by each task block may be consistent or may vary in a specific manner. For example, the task blocks can all be 1 Gigabyte (GB) in size, or can be changed according to any suitable rules. The task distribution section 142 is used to provide the data, parameters and configuration information required to execute the processing task, while the intermediate result section 144 is used to optimize the data transfer between different processing tasks, and the final result section 146 is used to store the result to be uploaded to the serial subsystem 110.

In accordance with one or more embodiments, the respective region divisions of intermediate result section 144 and final result section 146 are consistent with the task distribution section 142. For example, task distribution section 142 has 16 task blocks, then intermediate result section 144 and final result section 146 each have 16 task blocks. In addition, the rule of the changes of the size of the respective task blocks of the intermediate result section 144 and the final result section 146 is also consistent with the rule of the changes of the size of the task blocks of the task distribution section 142. In another possible implementation, the task distribution section 142, the intermediate result section 144, and the final result section 146 are consistent in two configuration parameters. The first configuration parameter is the maximum data space supported by a single processing task (called "Task Size"), which is the maximum physical memory space that a single task block can occupy. The second configuration parameter is the maximum number of tasks that can be supported, that is, the maximum number of task blocks in the same area (called "Task Num"). For example, task distribution section 142 has 16 task blocks and each task block is 1 GB in size, which means that the first configuration parameter ("Task Size") is 1 GB and the second configuration parameter ("Task Num") is 16. For another example, task distribution section 142 has 32 task blocks, and the task block size is selected between 1 GB, 2 GB and 4 GB, which means that the first configuration parameter ("Task Size") is 4 GB, and the second configuration parameter ("Task Num") is 32. After determining the first configuration parameter and second configuration parameter according to task distribution section 142, intermediate result section 144 and final result section 146 also conform to these two configuration parameters, so that a matching among task distribution section 142, intermediate result section 144, and final result section 146 can be implemented. For example, task distribution section 142 has 16 task blocks and each task block size is 1 GB, then intermediate result section 144 also has 16 task blocks and each task block size is 1 GB, and final result section 146 also has 16 task blocks and each task block size is 1 GB. It should be understood that the first configuration parameter ("Task Size"), which is the maximum data space supported by a single processing task, and the second configuration parameter ("Task Num"), which is the maximum number of tasks that can be supported, can be flexibly set and adjusted, and can also be adjusted based on reconfigurable technology, for example, based on static reconfigurable technology before power-on or based on dynamic reconfigurable technology during operation. These are determined according to actual requirements and the actual physical memory size of the parallel subsystem memory 140, and this is not specifically limited. As long as the parallel subsystem memory 140 is divided into three sections, namely the task distribution section 142, the intermediate result section 144, and the final result section 146, and these three sections are consistent in the first configuration parameter and the second configuration parameter, the matching among the three sections can be realized, thereby beneficial for cooperation with other components of the parallel subsystem 120 to realize parallel processing of multiple processing tasks.

Regarding the multiple task blocks included in the task distribution section 142, each task block corresponds to a processing task. For example, assuming there are 16 task blocks in task distribution section 142, and these 16 task blocks are in one-to-one correspondence with 16 processing tasks. Moreover, each task block includes configuration information of the processing task corresponding to the task block, and the configuration information includes at least the number of operands of the computing mode corresponding to the processing task and the respective source identifiers and data address information of each operand. As mentioned above, the related algorithms of federated learning and privacy-preserving computation are analyzed and expanded to obtain multiple processing tasks, each processing task corresponds to a computing mode, and each computing mode can be expressed as performing specific operations to one, two, three or more operands. The configuration information of the processing task corresponding to the task block included in the task block of the task distribution section 142 may include various information, including at least the number of operands of the computing mode corresponding to the processing task and the respective source identifiers and data address information of each operand. In this way, the task management module 124 can read the configuration information in the task block of the task distribution section 142 of the parallel subsystem memory 140 through the memory r/w control module 126, thereby obtaining the number of operands of the computing mode corresponding to the processing task and the respective source identifiers and data address information of each operand, so as for coordinating the parallel computing engine 130 of the parallel subsystem 120 to execute the computing mode corresponding to the processing task. The number of operands in the computing mode corresponding to the processing task refers to how many operands the computing mode needs to perform a specific operation on, and the source identifiers of each operand are used to indicate that each operand comes from the data distributed from the serial subsystem or from the intermediate result section of the parallel subsystem memory. For example, it may be indicated by a 1-bit source identifier, which in a value of 0 means that it comes from the data distributed from the serial subsystem and in a value of 1 means that it comes from the intermediate result section of the parallel subsystem memory. The respective data address information of each operand is used to identify the data address of each operand so that each operand may be obtained. For example, the respective data address information of each operand may include the lower 32 bits of the data header address and the upper 32 bits of the data header address in the data address information of each operand. Then, by splicing the lower 32 bits of the data header address and the upper 32 bits of the data header address, one may get the complete data header address. In some exemplary embodiments, the data header address can be divided into three or more segments, and the complete data header address can be obtained by splicing each segment. For example, by splicing four 32-bit segments, one may get a data header address equivalent to 128 bits. This can reduce the size of the physical memory space occupied by each segment of the data header address. In some exemplary embodiments, the respective data address information of each operand may adopt any suitable data format or storage technology, as long as it can be used to indicate the data address of each operand so that each operand can be obtained. In some exemplary embodiments, the computing mode is a preset computing mode among a plurality of preset computing modes, the plurality of preset computing modes include modular exponentiation calculation, modular multiplication calculation, RSA intersection calculation, homomorphic encryption, homomorphic decryption, DH key exchange, encrypted state addition, encrypted state multiplication, encrypted state multiplication and addition, matrix multiplication, and ciphertext summation.

In this way, in the multiple task blocks of the task distribution section 142, each task block corresponds to a processing task and each task block contains configuration information of the processing task corresponding to the task block, and the configuration information at least includes the number of operands of the computing mode corresponding to the processing task and the respective source identifiers and data address information of each operand. Through the respective source identifiers of each operand, it can be determined that each operand comes from the data distributed by the serial subsystem or from the intermediate result section of the parallel subsystem memory, and then each operand can be obtained through the data address information of each operand respectively. Therefore, by allocating a task block for each processing task distributed to the parallel subsystem 120 and providing configuration information in the task block, and by having the configuration information at least includes the number of operands of the computing mode corresponding to the processing task and the respective source identifiers and data address information of each operand, consequentially the task management module 124 can determine through the configuration information that the current processing task and the operand involved in the corresponding computing mode are the data distributed by the serial subsystem or the intermediate result from the parallel subsystem memory section, and can obtain the respective operand through the configuration information. As a result, by assigning a task block to each processing task and providing the above-mentioned configuration information in the task block, the data interaction between the serial subsystem 110 and the parallel subsystem 120 that originally required complex control operations to be completed is realized in a data-flow-driven manner. Specifically, the result of one processing task mentioned above can be used as the input data of another processing task. For example, the input data for the computing mode corresponding to formula (6) and the respective processing task come from the result of the computing mode corresponding to formula (5) and the respective processing task. With reference to one or more embodiments of the present disclosure, one may set the source identifier of the operand in the configuration information of the task block corresponding to the processing task in formula (6) to indicate that the operand comes from the intermediate result section from the memory of the parallel subsystem, so that the parallel subsystem 120 may utilize the source identifier of the operand to read the intermediate result section and obtain the operand, i.e., the result from the computing mode corresponding to formula (5) and the respective processing task. In this way, the negative effects such as delay and reading and writing operations caused by the uploading of the data from the parallel subsystem 120 to the serial subsystem 110 and then distribution by the serial subsystem 110 to the parallel subsystem 120 are avoided. When multiple operands are involved, such as three operands, the respective source identifiers of each operand are independent of each other, and are used to determine that each operand comes from the data distributed by the serial subsystem or from the intermediate result section in the parallel subsystem memory. For example, the first operand may be identified that it comes from the data distributed by the serial subsystem, the second operand may be identified that it comes from the intermediate result section in the memory of the parallel subsystem, and the third operand may be identified that it comes from the data distributed by the serial subsystem. In this way, the parallel subsystem 120 can obtain the first operand and the third operand from the data distributed by the serial subsystem, and obtain the second operand from the intermediate result section. In other words, in the case that the result of one processing task may be used as the input data of another processing task, the result of the processing task can be obtained from the intermediate result section and used as the operand of the computing mode corresponding to the other processing task, thereby saving the operations of uploading and distributing data and also saving reading and writing operations of the memory. As such, one may flexibly deal with various possible situations after analyzing and expanding the related algorithms of federated learning and privacy-preserving computation, which is beneficial to optimizing data interaction in various possible situations and helpful to achieving efficient computing, low processing delay, and high efficiency of memory utilization.

In accordance with one or more embodiments, in order to further optimize the data interaction, the configuration information may also include a computing result storage identifier, and the computing result storage identifier is used to identify that the result of the processing task is stored in the intermediate result section or the final result section. The task management module 124 can use the configuration information to determine that the result of the current processing task and respective computing mode are stored in the intermediate result section or the final result section. For example, the input data for the computing mode corresponding to formula (6) and the respective processing task come from the result of the computing mode corresponding to formula (5) and the respective processing task. With reference to one or more embodiments of the present disclosure, one may set the computing result storage identifier in the configuration information of the task block corresponding to the processing task in formula (5) to identify that the result of the processing task is stored in the intermediate result section, so that the parallel subsystem 120 will utilize the computing result storage identifier to store the result of the processing task in the intermediate result section, which is beneficial for subsequent processing. In addition, the serial subsystem 110 can also learn that the result of the processing task is stored in the intermediate result section according to the computing result storage identifier, which means that the result of the processing task can be used for other processing tasks, so it does not need to be processed by the serial subsystem 110 by data reading operations, thereby reducing latency and saving resources. When the computing result storage identifier identifies that the result of this processing task is stored in the final result section, it means that the result of this processing task will not be used for subsequent processing tasks, and may be uploaded to serial subsystem 110. However, in accordance with one or more embodiments, the computing result storage identifier identifies that the result of this processing task is stored in the final result section, which may only mean that there is no need for data transmission between the result of this processing task and the processing tasks to be distributed in the next wave or the processing tasks that are still running and need cyclic execution. In other words, the result of this processing task may not need to be used for the input data of these processing tasks. However, the result of this processing task may be used for another wave after the next wave or further subsequent processing tasks, but it is more suitable for uploading the result of this processing task back to the serial subsystem 110 and distributing them as input data at an appropriate time instead of saving them in the intermediate result section 144. In consideration of the fact that the intermediate result section 144 has a limited size, therefore, sometimes it is appropriate to upload the result of the processing task back to the serial subsystem 110. That is, the computing result storage identifier represents the control operation that is applied to the result of a particular processing task from a global perspective.

In accordance with one or more embodiments, in order to further optimize data interaction, the configuration information may also include task batch number and task batch total count. Task batch number is used to identify batches that use the same computing mode to operate on the same batch of input data, and task batch total count is used to record the total number of batches that use the same computing mode to operate on the same batch of input data. As mentioned above, for the same batch of data, in the relevant application scenarios of federated learning and privacy-preserving computation, the same parameters can be applied, such as the modulus determined based on the key, etc., so the same computing mode can change the operand only according to the input data under the precondition that the parameters are maintained unchanged, so as to complete the operation of the input data of the same batch. In other words, multiple input data in the same batch belong to the same processing task and the corresponding computing mode, and the same parameters are also applied, only the operand needs to be changed every time new input data is adopted. Therefore, the task batch total count means the total number of input data in the same batch, and also the total number of batches that need to perform operations in the same computing mode, and the task batch number is used to identify a specific batch. For example, if there are 10 input data in the same batch, all of them need to perform the modular exponentiation calculation shown in the above formula (5) and apply the same parameters. The shared parameters are the exponent and the modulus; one may set the task batch total count to be 10 and the initial value of the task batch number to be 0. Then one may execute the processing task for ten times, each time obtaining new input data as a new operand, and incrementing the task batch number until after 10 executions, and the task batch number is incremented to 10 and equal to the task batch total count.

In accordance with one or more embodiments, in order to further optimize the data interaction, the configuration information may also include other information, including but not limited to, the task serial number, which is used to identify the processing task so as to distinguish it from other processing tasks; the computing mode corresponding to the processing task, which is used to identify the type of the computing mode, such as being identified as the modular exponentiation calculation shown in the above formula (5); and the number of parameters that are used to identify the number of parameters involved in the computing mode corresponding to this processing task. For example, the computing mode shown in the above formula (5) involves two parameters, namely the power exponent and the modulus. The configuration information may also include the parameter width, which is used to describe the width of each parameter. Generally speaking, the parameter width refers to how many bits if binary number each parameter may be represented as, i.e., in units of bits. The configuration information may also include the width of each operand, that is, how many bits of binary numbers each operand can be represented as, for subsequent reading operations. The configuration information may also include the data total length of each operand, for subsequent reading operations. The data total length is generally in units of bytes, that is, 8 bits.

Figure 2:
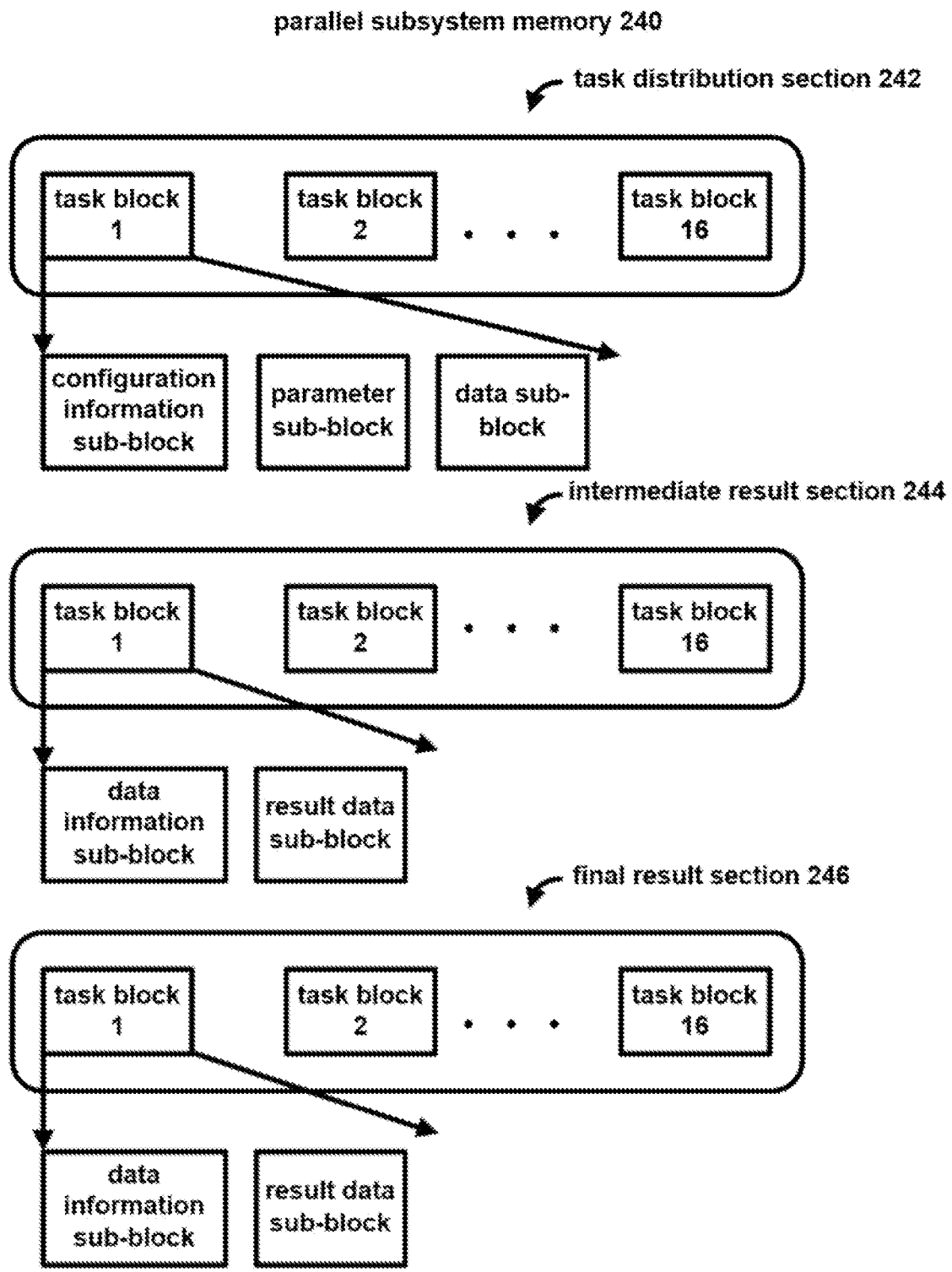
FIG. 2 is a block diagram illustrating a memory on the parallel subsystem side of the heterogeneous processing system of FIG. 1 in accordance with one or more embodiments of the present disclosure.

Referring to FIG. 2, FIG. 2 is a block diagram illustrating a memory on the parallel subsystem side of the heterogeneous processing system of FIG. 1 in accordance with one or more embodiments of the present disclosure. The parallel subsystem memory 140 shown in FIG. 1 corresponds to the parallel subsystem memory 240 shown in FIG. 2. The task distribution section 142, the intermediate result section 144, and the final result section 146 included in the parallel subsystem memory 140 shown in FIG. 1 correspond to the task distribution section 242, the intermediate result section 244, and the final result section 246 of the parallel subsystem memory 240 shown in FIG. 2, respectively. The task distribution section 242 includes a plurality of task blocks, and each task block is further divided into configuration information sub-block, parameter sub-block and data sub-block. The configuration information sub-block is used to store the configuration information of the processing task corresponding to the task block, and the configuration information at least includes the number of operands of the computing mode corresponding to the processing task and the respective source identifier and data address information of each operand. In addition, the configuration information may also include computing result storage identifier, task batch number, task batch total count, task serial number, computing mode corresponding to this processing task, number of parameters, parameter width, width of each operand, the data total length, etc. The configuration information stored in the configuration information sub-block can utilize multiple fields, and each field corresponds to one type of configuration information. Below will further describe these with reference to Table 1.

TABLE 1

| CMD ID | CMD DATA | Description |
|---|---|---|
| 1 | TASK ID | task serial number, for identifying corresponding process task |
| 2 | OP_MODE | the computing mode corresponding to the processing task |
| 3 | BATCH_ID | task batch number, for identifying a batch that uses the same computing mode to operate on the same batch of input data |
| 4 | BATCH_SIZE | task batch total count, for recording the total number of batches that use the same computing mode to operate on the same batch of input data |
| 5 | RESULT_BUF_FLAG | computing result storage identifier, for identifying that the result of the processing task is stored in the intermediate result section or the final result section |
| 6 | PARAM_NUM | the number of parameters (parameter number) included in the parameter sub-block |
| 7 | PARAM_WIDTH | the width of each parameter (parameter width) in the parameter sub-block (in bits generally) |
| 8 | OPDATA_NUMBER | the number of operands of the computing mode corresponding to the processing task (two or three operands generally) |
| 9 | OPDATA1_WIDTH | the width of the first operand, for subsequent reading operations |
| 10 | OPDATA2_WIDTH | the width of the second operand, for subsequent reading operations |
| 11 | OPDATA3_WIDTH | the width of the third operand, for subsequent reading operations |
| 12 | OPDATA1_LENGTH | the data total length of the first operand, for subsequent reading operations |
| 13 | OPDATA2_LENGTH | the data total length of the second operand, for subsequent reading operations |
| 14 | OPDATA3_LENGTH | the data total length of the third operand, for subsequent reading operations |
| 15 | OPDATA1_SRC_FLAG | source identifier of the first operand, for indicating the operand comes from the data distributed from the serial subsystem (marked as 0) or from the intermediate result section of the parallel subsystem memory (marked as 1) |
| 16 | OPDATA2_SRC_FLAG | source identifier of the second operand, for indicating the operand comes from the data distributed from the serial subsystem (marked as 0) or from the intermediate result section of the parallel subsystem memory (marked as 1) |
| 17 | OPDATA3_SRC_FLAG | source identifier of the third operand, for indicating the operand comes from the data distributed from the serial subsystem (marked as 0) or from the intermediate result section of the parallel subsystem memory (marked as 1) |
| 18 | OPDATA1_ADDR_LOW | lower 32 bits of the data header address in the data address information of the first operand |
| 19 | OPDATA1_ADDR_HIGH | upper 32 bits of the data header address in the data address information of the first operand |
| 20 | OPDATA2_ADDR_LOW | lower 32 bits of the data header address in the data address information of the second operand |

TABLE 1-continued

| CMD ID | CMD DATA | Description |
|---|---|---|
| 21 | OPDATA2_ADDR_HIGH | upper 32 bits of the data header address in the data address information of the second operand |
| 22 | OPDATA3_ADDR_LOW | lower 32 bits of the data header address in the data address information of the third operand |
| 23 | OPDATA3_ADDR_HIGH | upper 32 bits of the data header address in the data address information of the third operand |

Referring to Table 1 above, Table 1 shows a plurality of fields included in the configuration information, each of which has a serial number CMD ID, a field meaning CMD DATA, and related descriptions. The field number ("CMD ID" in Table 1) is only an example, as long as fields with different meanings are assigned different numbers, there may be any suitable field numbering methods. In addition, as long as the field numbers and field meanings ("CMD DATA" in Table 1) are in one-to-one correspondence, i.e., different field meanings have different field numbers, the arrangement of each field in the configuration information can also be adjusted flexibly. The field numbers in Table 1 are number 1, number 2, all the way to number 23 in order from top to bottom, which is just an exemplary arrangement. As mentioned above, the configuration information includes at least the number of operands of the computing mode corresponding to the processing task and the respective source identifier and data address information of each operand. These are referred to in Table 1: the field that has a field number of 8 in Table 1 ("OPDATA_NUMBER") is the number of operands of the computing mode corresponding to this processing task (usually 2 or 3); the fields that have field numbers of 15, 16, and 17 ("OPDATA1_SRC_FLAG", "OPDATA2_SRC_FLAG", "OPDATA3_SRC_FLAG") are the source identifier of the first operand, the source identifier of the second operand, and the source identifier of the third operand, respectively; the fields that have field numbers of 18 and 19 are the lower 32 bits and the upper 32 bits of the data header address in the data address information of the first operand, respectively; the fields that have field numbers of 20 and 21 are the lower 32 bits and the upper 32 bits of the data header address in the data address information of the second operand, respectively; the fields that have field numbers of 22 and 23 are the lower 32 bits and the upper 32 bits of the data header address in the data address information of the third operand, respectively. In addition, the configuration information can also include the computing result storage identifier, which is referred to in Table 1: the field that has a field number of 5 ("RESULT_BUF_FLAG") in Table 1 is the computing result storage identifier, which is used to identify the result of this processing task is stored in the intermediate result section or the final result section. In addition, the configuration information can also include task batch number and task batch total count, which are referred to in Table 1: the field that has a field number of 3 ("BATCH_ID") in Table 1 is the task batch number, which is used to identify a batch that uses the same computing mode to operate on the same batch of input data; the field that has a field number of 4 in Table 1 ("BATCH_SIZE") is the task batch total count, which is used to record the total number of batches that use the same computing mode to operate on the same batch of input data. The configuration information may also include other information, including but not limited to, the field having the field number of 1 which is the task serial number; the field having the field number of 2 which is the computing mode corresponding to the processing task; the field having the field number of 6 which is the number of parameters or called parameter number; the field having the field number of 7 which is the parameter width; the fields having the field numbers of 9 to 11 which are the width of each operand; the fields having the field numbers of 12 to 14 which are the data total length of each operand. Therefore, each field of the configuration information shown in Table 1 can also be understood as the configuration information including multiple control fields for controlling data interaction. Specifically, multiple control fields include each field listed in Table 1, including but not limited to, operand count field, operand source identifier field, operand data address information field, task serial number field, computing mode field, task batch number field, task batch total count field, computing result storage identifier field, parameter number field, parameter width field, operand width field, operand data total length field, and other fields listed in Table 1, and may further include any user-defined or fields based on participant-agreed content. For example, the multiple fields included in the configuration information shown in Table 1, or called multiple control fields, may also include a user-customized field, which is used to adjust the data interaction between the serial subsystem 110 and the parallel subsystem 120.

It should be understood that the field number of 2 is the computing mode corresponding to this processing task, and the computing mode refers to the analysis and expansion of the related algorithms of federated learning and privacy-preserving computation to obtain multiple processing tasks. Each processing task corresponds to a computing mode. Therefore, the computing mode defines the specific operation to be performed by the corresponding processing task. In some exemplary embodiments, the computing mode (the field "OP_MODE" with a field number of 2 in Table 1) may be user-defined, or may be agreed upon by federated learning participants, or may be one of preset multiple computing modes. The preset multiple computing modes can be determined according to the calculations involved in the common problems of federated learning. For example, it can include the following defined computing modes: modular exponentiation calculation, modular multiplication calculation, RSA intersection calculation, homomorphic encryption, homomorphic decryption, DH key exchange, encrypted state addition, encrypted state multiplication, encrypted state multiplication and addition, matrix multiplication and ciphertext summation. The corresponding fields in Table 1 can be used to distinguish different computing modes by numerical numbers or any suitable method, which is not specifically limited here.

It should be understood that the configuration information stored in the configuration information sub-block and the fields shown in Table 1 may also include any other information to facilitate the execution of this processing task, and may include user-defined content. In addition, the field number and the field meaning can also be freely configured, as long as the one-to-one correspondence is satisfied, such that the field meaning can be quickly identified and distinguished according to the field number. Further, in addition to the way described by multiple fields in Table 1, the configuration information can also describe different types of configuration information in any suitable way, such as a retrieval table, an image, and the like. In accordance with one or more embodiments, a multi-field method similar to Table 1 is used to describe the configuration information, and the size of the entire configuration information sub-block is set to 32 kilobytes (KB), and the corresponding field numbers ("CMD ID" in Table 1) and the field meaning ("CMD DATA" in Table 1) each occupy 4 bytes and are defined together as a field, and the size of each such field is 8 bytes. Taking Table 1 as an example, there are 23 fields in total. The configuration information sub-block with a size of 32 KB can accommodate up to 4,000 fields as a whole, which means that 4,000 fields with different meanings can be defined. In addition, the configuration information sub-block can also reserve a physical memory space of 4 bytes to indicate the total number of fields included, like using a dedicated space of 4 bytes to store the information of the total number of fields. The configuration information sub-block can also provide more dedicated space to save other special information for the execution of this processing task.

Continue referring to FIG. 2, as described above, the task distribution section 242 includes a plurality of task blocks, and each task block is further divided into configuration information sub-block, parameter sub-block, and data sub-block. The configuration information stored in the configuration information sub-block is used to provide the relevant information for executing the processing task corresponding to the task block, and is also used to provide the necessary information for analyzing and utilizing the parameter sub-block and the data sub-block, so as to facilitate the execution of the processing task. The configuration information includes at least the number of operands of the computing mode corresponding to the processing task and the respective source identifier and data address information of each operand. The parameter sub-block is used to store the parameters of the computing mode. As mentioned above, for the same batch of data, in the relevant application scenarios of federated learning and privacy-preserving computation, the same parameters can be applied, such as the modulus determined based on the key, etc., so the same computing mode may need only change the operand according to the input data under the premise that the parameters remain unchanged, so as to complete the operation of the input data of the same batch. In other words, multiple input data in the same batch belong to the same processing task and the corresponding computing mode, and the same parameters are also applied, only the operand needs to be changed every time new input data is adopted. For example, the same parameters apply to the modular exponentiation calculation shown in formula (5) above. The parameter-related information stored in the parameter sub-block can be expressed as, for example, the field having a field number of 6 shown in Table 1 above which is parameter number (i.e., the number of parameters included in the parameter sub-block); and the field having a field number of 7 which is the parameter width (i.e., the width of each parameter of the parameter sub-block).

Continue referring to FIG. 2, the data sub-block is used to store the data to be calculated, i.e., each operand. As mentioned above, the related algorithms of federated learning and privacy-preserving computation are analyzed and expanded to obtain multiple processing tasks, each processing task corresponds to a computing mode, and each computing mode can be expressed as performing specific operations to one, two, three or more operands. Therefore, the calculation formula of the specific operation corresponding to the computing mode, such as the above formula (5), includes two types of data, namely parameters and operands. Operands can be plaintext, encrypted data, or any raw data to be calculated, and parameters are parameters shared by the same batch of input data. For multiple input data of the same batch, the same computing mode may only change the operands according to the input data on the premise of keeping the parameters unchanged, and each using of new input data means a new batch and marking with the task batch number that corresponds to the field of field number 3 as shown in Table 1 above. Each operand can be obtained through the number of operands in the computing mode corresponding to the processing task and the respective data address information of each operand included in the configuration information. For example, Table 1 illustratively shows an example of three operands, the first operand, the second operand, and the third operand can be obtained through the fields having field numbers of 18 to 23. In addition, for the new input data of the same batch, it can be calculated according to the width and total data length of each operand, combined with the data address information of each operand, so as to obtain each operand corresponding to the new input data. For example, assuming the computing mode is to perform an encrypted state multiplication and addition operation on three operands, and the result obtained by multiplying the first operand and the second operand is added to the third operand. Further, assuming there are two input data in the same batch, which means that two encrypted state multiplication and addition operations are required. For the first input data, the first operand can be read by the width of the first operand (the field having the field number 9 in Table 1) and the data total length of the first operand (the field having the field number 12 in Table 1), so as to determine the range to be read by the reading operation, and the object of the reading operation may be determined by the data address information of the first operand (the field having field numbers of 18 and 19 in Table 1), thereby completing the reading operation of the first operand. Similarly, by determining the respective widths, data total lengths, and data address information of each operand, the read operations for the second and third operands can be completed. In accordance with one or more embodiments, each operand can be preset to have a fixed width and a data total length, for example, it may be preset that the width is 8 bytes and the data total length is 1024 bytes, so that only the data address information needs to be read to complete the reading operation. For the second input data, it is necessary to perform a simple calculation based on the reading operation of each operand corresponding to the first input data, so as to complete the reading operation of each operand corresponding to the second input data. Specifically, a specific numerical value can be added to the data address information of the first operand of the first input data, and the specific numerical value can be one-eighth of the width of the first operand. The data address information obtained after such addition corresponds to first operand of the second input data. The specific numerical value is used to estimate the data address information of the operand of the next input data according to the data address information of the operand of the previous input data, and thus can be determined from the width of the operand. In some exemplary embodiments, any suitable address distribution manner may be used to arrange the data address information of the operands of different input data as long as the reading operation of the operands can be performed. Similarly, a specific numerical value can be added to the data address information of the second operand of the first input data, and the specific numerical value is one-eighth of the width of the second operand, so that the data address information obtained after such addition corresponds to the second operand of the second input data. Also, a specific numerical value can be added to the data address information of the third operand of the first input data, and the specific numerical value is one-eighth of the width of the third operand, so that the data address information obtained after such addition corresponds to the third operand of the second input data. With reference to above Table 1, the lower 32 bits and the upper 32 bits of the data address information of the first operand can be obtained through the fields having field numbers of 18 and 19, so as to obtain the complete data address information of the first operand, which is the data address information of the first operand of the first input data; the data address information of the first operand of the second input data is obtained by adding the data address information of the first operand of the first input data with one-eighth of the width of the first operand (the field having a field number of 9); and so on, the data address information of the first operand of more input data can be obtained. Similarly, the lower 32 bits and the upper 32 bits of the data address information of the second operand can be obtained through the fields having field numbers of 20 and 21, so as to obtain the complete data address information of the second operand, which is the data address information of the second operand of the first input data; the data address information of the second operand of the second input data is obtained by adding the data address information of the second operand of the first input data with one-eighth of the width of the second operand (the field having a field number of 10); and so on, the data address information of the second operand of more input data can be obtained. Similarly, the lower 32 bits and the upper 32 bits of the data address information of the third operand can be obtained through the fields having field numbers of 22 and 23, so as to obtain the complete data address information of the third operand, which is the data address information of the third operand of the first input data; the data address information of the third operand of the second input data is obtained by adding the data address information of the third operand of the first input data with one-eighth of the width of the third operand (the field having a field number of 11); and so on, the data address information of the third operand of more input data can be obtained.

As mentioned above, the task distribution section 242 includes a plurality of task blocks, and each task block is further divided into configuration information sub-block, parameter sub-block, and data sub-block. Based on the configuration information stored in the configuration information sub-block, the parameters stored in the parameter sub-block can be analyzed and obtained, and the data to be calculated stored in the data sub-block, i.e., each operand, can be analyzed and obtained, so as to perform the computing mode corresponding to this processing task. Moreover, the configuration information includes at least the number of operands of the computing mode corresponding to the processing task and the respective source identifier and data address information of each operand, so that one may base on the respective source identifiers of each operand determine the operands involved in the current processing task and the corresponding computing mode come from the data distributed by the serial subsystem or from the intermediate result section of the parallel subsystem memory, and one may obtain the respective operands through the data address information. Moreover, the configuration information may also include a computing result storage identifier for identifying that the result of the processing task is stored in the intermediate result section or the final result section. The configuration information may also include other information in order for facilitating the performing of this processing task. Therefore, the related algorithms of federated learning and privacy-preserving computation are analyzed and expanded to obtain multiple processing tasks, each processing task corresponds to a computing mode, and each computing mode can be expressed as calculation formula that performs specific operations to one, two, three or more operands. The data to be calculated and parameters of each processing task are distributed to the configuration information sub-block, the parameter sub-block, and the data sub-block of the task block corresponding to the processing task. Based on the number of operands included in the configuration information and the respective source identifier and data address information of each operand, data uploading and distributing can be avoided, thereby reducing the delay and improving the computing efficiency. Also, based on the computing result storage identifier included in the configuration information, one can selectively write the results of individual processing tasks into the intermediate result section to facilitate subsequent processing tasks to read from the intermediate result section. In addition, the configuration information can also include other information including user-defined information, which is used to make better use of the parameter sub-block and the data sub-block, thereby becoming beneficial to flexibly deal with various possible scenarios after analyzing and expanding related algorithms of federated learning and privacy-preserving computation.

It should be understood that the multiple fields included in the configuration information shown in Table 1 and the various information included in the above configuration information are all exemplary, and may be adjusted, improved or supplemented according to actual needs. For example, the configuration information can include more operands such as four operands, then the fields in Table 1 should also be added accordingly with the width of the fourth operand, the data total length of the fourth operand, the source identifier of the fourth operand, and the data address information of the fourth operand, etc. In addition, the field number and field meaning of each filed respectively as well as the size of each field may also be flexibly adjusted, and the arrangement order of each field in the configuration information sub-block can also be adjusted. For another example, the specific markings in Table 1 can also be flexibly adjusted. For example, the field having a field number of 5 is the computing result storage identifier ("RESULT_BUF_FLAG"), and a marking of 0 indicates that the result is stored in the intermediate result section and a marking of 1 indicates that the result is stored in the final result. section, or vice versa. Similarly, the field having a field number of 15 is the source identifier of the first operand, and the specific marking can also be adjusted flexibly, as long as it can coordinate with the relevant components to complete the required function. In addition, regarding the size of configuration information sub-block, parameter sub-block, and data sub-block, in accordance with one or more embodiments, the size of configuration information sub-block can be set to 32 KB, and the size of parameter sub-block can be set to 32 KB, and the size of the entire task block, which is the maximum physical memory space that a single task block can occupy ("Task Size"), can be set to 1 GB, so the size of the data sub-block is the difference by subtracting the size of the task block by the size of the configuration information sub-block as well as size of the parameter sub-block. These can be adjusted according to actual needs, as long as the matching between configuration information sub-block, parameter sub-block, and data sub-block is guaranteed, so that the required parameters and operands can be analyzed and obtained according to the configuration information.

Still referring to FIG. 2, the respective region divisions of intermediate result section 244 and final result section 246 are consistent with task distribution section 242, i.e., they have the same number of task blocks. For example, task distribution section 242 has 16 task blocks, then intermediate result section 244 and final result section 246 each have 16 task blocks. Each task block of the intermediate result section 244 is further divided into a data information sub-block and a result data sub-block. Each task block of the final result section 246 is further divided into a data information sub-block and a result data sub-block. Among them, the data information sub-block of the intermediate result section 244 and the data information sub-block of the final result section 246 are both used to analyze the respective result data sub-blocks and obtain the required data. Also, the data information sub-blocks of intermediate result section 244 and final result section 246 maintain the same format, including some information for verification. In accordance with one or more embodiments, the data information sub-block includes at least task serial number, task batch number, task batch total count, computing mode, result data width and result data length. Here, task serial number, task batch number, task batch total count, and computing mode correspond to the fields having field numbers of 1, 3, 4, and 2 shown in Table 1 above, respectively. The result data width refers to the width of the result data stored in the result data sub-block, for example, in units of bits. The result data length refers to the length of the result data stored in the result data sub-block, for example, in units of bytes. The data information sub-block may also include other information such as user-defined or content agreed by the participants. For example, the user can customize a data priority field to identify the priority between different result data. The result data sub-blocks of the intermediate result section 244 and the final result section 246 also maintain the same format and are used to save the result data of the previous processing task. The result data width and result data length saved by the data information sub-block can be used to analyze and obtain the result data. It should be understood that the respective data information sub-blocks of the intermediate result section 244 and the final result section 246 include inspection information for verifying the configuration information stored in the configuration information sub-block of the task distribution section 242. By comparing the inspection information with the configuration information, if the two are consistent, the operation is considered normal, and if the two are inconsistent, the processing of the current task is stopped. Specifically, the respective data information sub-blocks of the intermediate result section 244 and the final result section 246 include the inspection information has a result data width and a result data length, which are respectively used to verify the width of the operand of the configuration information (such as "OPDATA1_WIDTH" in Table 1") and the data total length of the operand (such as "OPDATA1_LENGTH" in Table 1).

In accordance with one or more embodiments, each task block of task distribution section 242 includes configuration information sub-block, parameter sub-block, and data sub-block, respectively. The size of the configuration information sub-block is 32 KB, the size of the parameter sub-block is 32 KB, and the size of the entire task block is 1 GB, so the size of the data sub-block is 1 GB minus 64 KB. Each task block of the intermediate result section 244 includes the data information sub-block and the result data sub-block, respectively, where the size of the data information sub-block is 64 KB, and the size of the entire task block is 1 GB, so the size of the result data sub-block is 1 GB minus 64 KB. Each task block of the final result section 246 includes the data information sub-block and the result data sub-block, respectively, where the size of the data information sub-block is 64 KB, and the size of the entire task block is 1 GB, so the size of the result data sub-block is 1 GB minus 64 KB. Therefore, the data sub-block included in each task block of the task distribution section 242 has the same size as the result data sub-block included in each task block of the intermediate result section 244, and it also has the same size as the result data sub-block included in each task block of the final result section 246. In this way, with reference to the feature that above-mentioned first configuration parameter (the maximum physical memory space that a single task block can occupy) and second configuration parameter (the maximum number of task blocks in the same area) are consistent, and also referring to the feature that the region division is consistent, it becomes beneficial for matching between different sections of the parallel subsystem memory 240 and also beneficial to improve the overall computing performance.

Referring to FIG. 1 and FIG. 2, as mentioned above, the content in the configuration information shown in Table 1 at least includes the number of operands of the computing mode corresponding to the processing task and the respective source identifier and data address information of each operand, and the source identifier may identify that the operand comes from the data distributed by the serial subsystem or from the intermediate result section in the parallel subsystem memory. Therefore, when the source identifier of a particular operand identifies that the operand comes from the data distributed by the serial subsystem, the operand can be obtained from the data sub-block of the corresponding task block of the task distribution section through the data address information of the operand; and, when the source identifier of a particular operand identifies that the operand comes from the intermediate result section of the parallel subsystem memory, the operand can be obtained from the result data sub-block of the corresponding task block of the intermediate result section through the data address information of the operand. Therefore, for the convenience of the reading operation, in accordance with one or more embodiments, the data sub-block of the task block of the task distribution section and the result data sub-block of the task block of the intermediate result section use a consistent way to save data, so that the operand can be obtained from the task distribution section or the intermediate result section according to the data address information of the operand. In addition, by setting a consistent way of saving data, it is also possible to verify whether an error occurs according to the data information sub-block of the task block of the intermediate result section. For example, one or more of the task serial number, task batch number, task batch total count, and computing mode stored in the data information sub-block of the task block in the intermediate result section can be read, and then compared and verified with respect to the contents of the configuration information sub-block of the task block in the task distribution section to determine if an error has occurred. In addition, by setting a consistent way of saving data, the operand can be obtained through the data address information of the operand stored in the configuration information sub-block of the task block of the task distribution section, or can be obtained through the result data width and the result data length stored in the data information sub-block of the task block of the intermediate result section. And, the data address information can be compared and verified with the result data width and the result data length, so as to determine whether an error occurs. The following describes how to deal with the problem of data transmission between different processing tasks with reference to Table 2.

TABLE 2

| processing task serial number | computing result storage identifier | source identifier of the first operand | source identifier of the second operand | source identifier of the third operand |
|---|---|---|---|---|
| processing task 1 | 0 (stored in intermediate result section) | 0 (from data distributed) | 0 (from data distributed) | there is no third operand |
| processing task 2 | 0 (stored in intermediate result section) | 0 (from data distributed) | 0 (from data distributed) | 1 (from intermediate result section), the third operand is the result of processing task 1 |
| processing task 3 | 1 (stored in final result section) | 0 (from data distributed) | 1 (from intermediate result section), the second operand is the result of the processing task 1 | 1 (from intermediate result section), the third operand is the result of processing task 2 |

As shown in Table 2 above, in accordance with one or more embodiments, there are three processing tasks, namely processing task 1, processing task 2, and processing task 3. The processing task 1 involves two operands, and the result of processing task 1 is stored in the intermediate result section. The processing task 2 involves three operands. Among the three operands of processing task 2, the first operand and the second operand come from the data distributed while the third operand comes from the intermediate result section and is the result of the processing task 1. And the result of the processing task 2 is stored in the intermediate result section. Therefore, through the configuration information and the fields shown in Table 1, as well as the data storage method of the intermediate result section, when processing task 2 is executed, the third operand that is required can be obtained from the intermediate result section without going through the data uploading and distributing. In addition, processing task 3 involves three operands. Among the three operands of processing task 3, the first operand comes from the data distributed, the second operand comes from the intermediate result section and is the result of processing task 1, and the third operand comes from the intermediate result section and is the result of the processing task 2. Therefore, when the processing task 3 is executed, the required second and third operands can be obtained from the intermediate result section, without the need to upload and distribute data. After analyzing and expanding the related algorithms of federated learning and privacy-preserving computation to obtain multiple processing tasks, there may be data transmission needs between these multiple processing tasks, i.e., the result of one processing task is used as the input data or at least a part of the input data for another processing task, and several processing tasks may constitute the iterative calculation part that needs to perform cyclic calculation. If an external controller such as a CPU or a control command is used to coordinate the data transmission between these processing tasks, it often involves data uploading and distributing operations, which is not beneficial for reducing delay and improving computing efficiency. To this end, one or more embodiments of the present disclosure provides, as shown in FIG. 1 and FIG. 2, by adding a control field to the data stream to complete the necessary data transmission on the parallel subsystem side, thereby avoiding the need for the operation of uploading data from the parallel subsystem to the serial subsystem and then distributing from the serial subsystem to the parallel subsystem, consequentially optimizing the data interaction between the serial subsystem and the parallel subsystem. Taking Table 2 as an example, the computing result storage identifier is set to 0 in the configuration information of processing task 1, which means that the result of processing task 1 is stored in the intermediate result section. In the configuration information of processing task 2, the computing result storage identifier is set to 0, which means that the result of processing task 2 is stored in the intermediate result section; and the source identifier of the third operand is 1, which means that the third operand of processing task 2 comes from the intermediate result section. Therefore, through the configuration information of processing task 1 and the configuration information of processing task 2, the data transmission between processing task 1 and processing task 2 is completed, in other words, the result of processing task 1 is used as the third operand of processing task 2 which is a part of the input data. In addition, the computing result storage identifier of processing task 3 is 1, which means that the result of processing task 3 is stored in the final result section, i.e., it can be used for uploading to the serial subsystem. It should be understood that Table 2 is illustrative only.

Referring to FIG. 1 and FIG. 2, one or more embodiments of the present disclosure provide configuration information and various fields as shown in Table 1, so that the parallel subsystem responsible for parallel computing can determine, according to the configuration information, whether the required operand is from the data distributed or from the intermediate result section, the parallel subsystem can also determine, according to the configuration information, whether the result of this processing task is stored in the intermediate result section or in the final result section. Therefore, by adding the control fields to the data flow, and by performing section division on the parallel subsystem memory in a specific way so as to obtain the task distribution section, intermediate result section, and final result section that are closely related to each other, it is achieved that various complex computations of federated learning and privacy-preserving computation, especially the control issues in data interaction that are involved, are transformed into data-flow-driven issues based on control fields. Consequentially, the parallel subsystem, which is mainly responsible for parallel accelerated computations, on the premise that there is no need to upload data to the serial subsystem and receive control commands, may rely only on the configuration information on the side of the parallel subsystem memory to complete the data transmission between various processing tasks, thereby avoiding the waste of memory resources, processing capabilities, and input and output capabilities, and having the benefits of efficient computation, low processing latency, and high memory utilization. Moreover, the configuration information can include various types of information to further optimize the data interaction, such as user-defined content and content agreed by the participants, so as to better realize the data flow driving through the content of the configuration information, i.e., the control fields. In other words, the manager or user of the heterogeneous processing system can integrate user requirements into the data flow through flexibly configurable and self-defined configuration information such as the fields in Table 1. The configuration information should be distributed to the parallel subsystem together with the corresponding processing task, alternatively, they may not be distributed at the same time but the corresponding configuration information, i.e., the control fields, should be configured before the parallel subsystem starts to execute the processing task, so that the parallel subsystem may according to the configuration information perform the reading operation of the input data for the processing task and the writing operation of the result. As such, by providing the necessary control fields to realize data transmission between different processing tasks, including writing the result of a particular processing task into the intermediate result section and reading the input data for a particular processing task from the intermediate result section, the operation of data uploading and distributing is avoided, and various requirements such as user requirements can be integrated into the data flow driving mode through the configuration information that is flexibly configuration and customizable. Also, through the above-mentioned planning about data width, data length, size of physical memory space and the like, the matching between different sections is realized, and therefore it becomes beneficial to improve the overall computing performance. In addition, the intermediate result section, as a key section for data transfer between different processing tasks, is not only used to write the results of the processing task but also to read the operand of the processing task, and can be controlled as to whether to write into the intermediate result section by setting the computing result storage identifier in the configuration information. Therefore, considering the limited size of the intermediate result section or the limited resources of the parallel subsystem memory, one can pre-arrange the timing of writing the intermediate result section when the processing task is generated, or selectively prevent the results of individual processing tasks from being written to the intermediate result section and instead is uploaded back to the serial subsystem and then distributed. When the size of the intermediate result section is not enough relative to the data flow requirements, doing so can make a better use of the role of the intermediate result section, which is beneficial to improve the overall computing performance.

Referring to FIG. 1 and FIG. 2, it is mentioned that algorithms related to federated learning and privacy-preserving computation are analyzed and expanded to obtain multiple processing tasks. In the process of generating processing tasks, the algorithms need to be analyzed and expanded into computing mode. At the same time or after the processing task is generated, the corresponding configuration information can be generated, i.e., the control fields corresponding to each processing task. The control fields should include the necessary information to execute the processing task, including the number of operands of the computing mode corresponding to the processing task and the respective source identifier and data address information of each operand, so that the necessary operands can be obtained when the processing task is executed. The control fields should also include other information to obtain the necessary parameters. When faced with multiple processing tasks generated by complex algorithms, the parallel subsystem cannot process all processing tasks each time due to performance and resource constraints. In this case, one may use the control field, i.e., the computing result storage identifier in the configuration information, to selectively set the result of a specific processing task to be stored in the intermediate result section or final result section, and set to obtain the operand from the intermediate result section or the distributed data when the related processing task is executed. As such, data uploading and distributing can be selectively triggered according to actual needs, especially the size of the intermediate result section, thereby providing more flexibility to customize the design and flexibly adjust the overall control process. However, whether or not data uploading and distributing is triggered, these control processes are implemented through the control field, which should be configured in the task distribution section of the corresponding task block before executing the processing task. In this way, the control problem of data interaction is transformed into a data-flow-driven problem based on control field, and the original complex control flow can be completed through the flexible design of the control field, and more refined resource control and memory manipulation can also be achieved through the design of specific fields.

Figure 3:
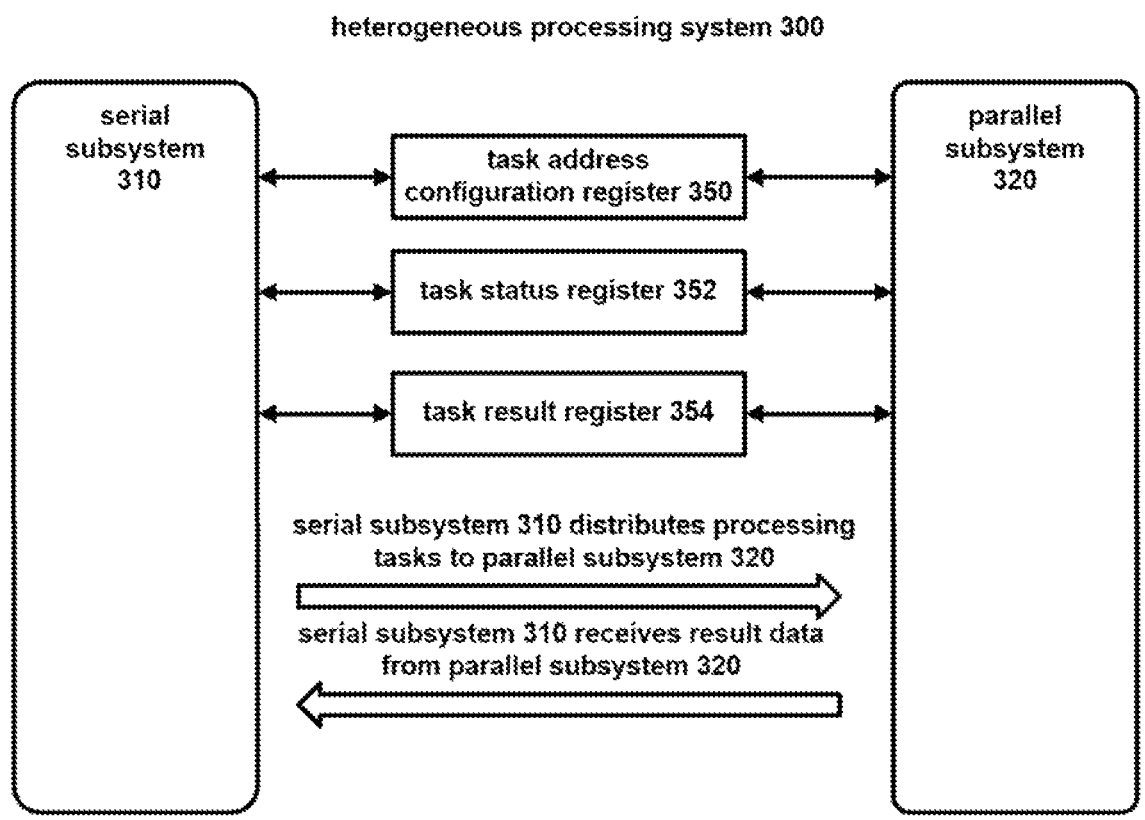
FIG. 3 is a block diagram illustrating a heterogeneous processing system in accordance with another implementation manner illustrated by one or more embodiments of the present disclosure.

Referring to FIG. 3, FIG. 3 is a block diagram illustrating a heterogeneous processing system in accordance with another implementation manner illustrated by one or more embodiments of the present disclosure. As shown in FIG. 3, the heterogeneous processing system 300 includes a serial subsystem 310 and a parallel subsystem 320. The structure and function of the serial subsystem 310 are similar to those of the serial subsystem 110 of the heterogeneous processing system 100 shown in FIG. 1, and the structure and functions of the parallel subsystem 320 are similar to those of the parallel subsystem 120 of the heterogeneous processing system 100 shown in FIG. 1. Therefore, with reference to FIG. 1 and FIG. 2, the above-mentioned flexible design of the control fields is used to complete the original complex control process, including the realization of the transmission between different processing tasks through the control fields (for example, the result of a processing task is used as the input data of another processing task), while avoiding the operations of uploading and distributing data. This is also applicable to the serial subsystem 310 and parallel subsystem 320 of the heterogeneous processing system 300. Therefore, the serial subsystem 310 analyzes and expands the related algorithms of federated learning and privacy-preserving computation to obtain multiple processing tasks and generate corresponding configuration information or control fields. The serial subsystem 310 distributes a plurality of processing tasks to the parallel subsystem 320. The memory of the parallel subsystem 320 is similar to the parallel subsystem memory 240 shown in FIG. 2, and has three sections, namely, the task distribution section, the intermediate result section, and the final result section. Each of the three sections has multiple task blocks, and each task block corresponds to one of the multiple processing tasks. As mentioned above, the design of specific fields is used to achieve more refined resource control and memory manipulations, and for example, through the control field, i.e., the computing result storage identifier in the configuration information, one may selectively set the result of specific processing tasks to be stored in intermediate. result section or final result section, applicable to parallel subsystem 320. In a word, by adding the control fields to the data stream, and by performing section division on the memory of the parallel subsystem 320 in a specific way, the task distribution section, the intermediate result section, and the final result section that are closely related to each other are obtained, so that the control problem in data interaction is transformed into a data-flow-driven problem based on the control fields. Consequentially, the parallel subsystem 320, which is mainly responsible for parallel accelerated computations, on the premise that there is no need to upload data to the serial subsystem 310 and receive control commands, may rely only on the configuration information on the side of the parallel subsystem 320 memory to complete the data transmission between various processing tasks, thereby avoiding the waste of memory resources, processing capabilities, and input and output capabilities, and having the benefits of efficient computation, low processing latency, and high memory utilization.

In order to further improve the data interaction between the serial subsystem 310 and the parallel subsystem 320, and to further simplify the control problem and improve the overall computing performance, the heterogeneous processing system 300 also includes a plurality of registers, which are the task address configuration register 350, the task status register 352, and the task result register 354. Among them, the task address configuration register 350 stores multiple records, each record corresponds to a data start address, and each record has a register address, a register name and a description. These records can be divided into three types, corresponding to the data start addresses in the task distribution section, intermediate result section, and final result section respectively. The serial subsystem 310 distributes multiple processing tasks to the parallel subsystem 320 and receives result data from the parallel subsystem 320. In order to ensure that when the serial subsystem 310 and the parallel subsystem 320 runs data interaction of the processing tasks and the result, the serial subsystem 310 and the parallel subsystem 320 can know physical memory addresses of relevant data and parameters of each processing task from each other, therefore, it is necessary to obtain a suitable data starting address by referring to each record of the task address configuration register 350 for subsequent operations. Here, the data start address is used to identify the task block corresponding to a specific processing task and read all data related to the task block in combination with the size of the task block under the condition that the storage content of the task block is continuously distributed. As mentioned above, given processing tasks have corresponding task blocks in the task distribution section, intermediate result section, and final result section. The task address configuration register 350 also correspondingly provides three types of data start addresses, which are respectively task source data start address, task intermediate result data start address, and task final result data start address, as shown in Table 3 below.

TABLE 3

| register address | register name | description |
|---|---|---|
| task source data start address configuration register specification corresponding to the task distribution section ||| 
| 0x00001000 | task_1_srcdata_addr_l | lower 4 bytes of task source data start address of task serial number 1 |
| 0x00001004 | task_1_srcdata_addr_h | upper 4 bytes of task source data start address of task serial number 1 |
| 0x00001008 | task_2_srcdata_addr_l | lower 4 bytes of task source data start address of task serial number 2 |
| 0x0000100c | task_2_srcdata_addr_h | upper 4 bytes of task source data start address of task serial number 2 |
| 0x00001010 | task_3_srcdata_addr_l | lower 4 bytes of task source data start address of task serial number 4 |
| 0x00001014 | task_3_srcdata_addr_h | upper 4 bytes of task source data start address of task serial number 1 |
| task intermediate result data start address configuration register specification corresponding to the intermediate result section |||
| 0x00002000 | task_1_bufdata_addr_l | lower 4 bytes of task intermediate result data start address of task serial number 1 |
| 0x00002004 | task_1_bufdata_addr_h | upper 4 bytes of task intermediate result data start address of task serial number 1 |
| 0x00002008 | task_2_bufdata_addr_l | lower 4 bytes of task intermediate result data start address of task serial number 2 |
| 0x0000200c | task_2_bufdata_addr_h | upper 4 bytes of task intermediate result data start address of task serial number 2 |
| 0x00002010 | task_3_bufdata_addr_l | lower 4 bytes of task intermediate result data start address of task serial number 3 |
| 0x00002014 | task_3_srcdata_addr_h | upper 4 bytes of task intermediate result data start address of task serial number 3 |
| task final result data start address configuration register specification corresponding to the final result section |||
| 0x00003000 | task_1_resldata_addr_l | lower 4 bytes of task final result data start address of task serial number 1 |
| 0x00003004 | task_1_resldata_addr_h | upper 4 bytes of task final result data start address of task serial number 1 |
| 0x00003008 | task_2_resldata_addr_l | lower 4 bytes of task final result data start address of task serial number 2 |

TABLE 3-continued

| register address | register name | description |
| --- | --- | --- |
| 0x0000300c | task_2_resldata_addr_h | upper 4 bytes of task final result data start address of task serial number 2 |
| 0x00003010 | task_3_resldata_add_l | lower 4 bytes of task final result data start address of task serial number 3 |
| 0x00003014 | task_3_resldata_addr_h | upper 4 bytes of task final result data start address of task serial number 3 |

Table 3 above illustratively shows the contents of the task address configuration register 350, which provides the task source data start address, the task intermediate result data start address, and the task final result data start address so as to correspond to the task distribution section, the intermediate result section, and the final result section, respectively. As shown in Table 3, the task source data start address configuration register specification corresponding to the task distribution section includes six records, and each record has a register address, a register name, and a description. The lower 4 bytes of task source data start address of task serial number 1 and the upper 4 bytes of task source data start address of task serial number 1 can be combined to obtain the complete task source data start address of task serial number 1, which can be used to obtain the start address of the corresponding task block in the task distribution section with respect to the processing task corresponding to task serial number 1. The start address of the corresponding task block in the task distribution section is combined with the size of the task block in the task distribution section that is mentioned above, such as the first configuration parameter ("Task Size"), to obtain the data in the task block. Similarly, the lower 4 bytes of task source data start address of task serial number 2 and the upper 4 bytes of task source data start address of task serial number 2 can be combined to obtain the complete task source data start address of task serial number 2, which can be used to obtain the start address of the corresponding task block in the task distribution section with respect to the processing task corresponding to task serial number 2. The lower 4 bytes of task source data start address of the task serial number 3 and the upper 4 bytes of task source data start address of task serial number 3 can be combined to obtain the complete task source data start address of task serial number 3, which can be used to obtain the start address of the corresponding task block in the task distribution section with respect to the processing task corresponding to task serial number 3. Still referring to Table 3, the task intermediate result data start address configuration register specification corresponding to the intermediate result section also includes six records, and each record has a register address, a register name, and a description. By combining the lower 4 bytes of the task intermediate result data start address and the upper 4 bytes of the task intermediate result data start address of the same task serial number, the complete task intermediate result data start address of each task serial number can be obtained, which can be used to obtain the start address of the corresponding task block in the intermediate result section with respect to the processing task of each task serial number. Similarly, the task final result data start address configuration register specification corresponding to the final result section also has six records, each record has a register address, a register name and a description. By combining the lower 4 bytes of the task final result data start address and the upper 4 bytes of the task final result data start address of the same task serial number, the complete task final result data start address of each task serial number can be obtained, which can be used to obtain the start address of the corresponding task block in the final result section with respect to the processing task of each task serial number. For example, assuming that the size of the task block is 1 GB, in the task source data start address configuration register specification, the data start address in the first record (register address is 0x00001000, the corresponding register name is task_1_srcdata_addr_l) is set as 0x00000000; the data start address in the second record (register address is 0x00001004, the corresponding register name is task_1_srcdata_addr_h) is set as 0x00000000; the data start address in the third record (register address is 0x00001008, the corresponding register name is task_2_srcdata_addr_l) is set as 0x40000000; the data start address in the fourth records (register address is 0x0000100C, and the corresponding register name is task_2_srcdata_addr_h) is set as 0x00000000. Accordingly, the task source data start address of the processing task of task serial number 1 is obtained by splicing the data start addresses of the first record and the second record to obtain 0x00000000, and then combined with the size of the task block of 1 GB, therefore, it is determined that the task source data end address corresponding to the processing task of task serial number 1 is 3FFFFFFF, which is convenient to read the data of the task block corresponding to the processing task of task serial number 1. Similarly, the task source data start address of the processing task of task serial number 2 is obtained by splicing the data start addresses of the third and fourth records to obtain 0x40000000, and then combined with the size of the task block of 1 GB, therefore, it is determined that the task source data end address corresponding to the processing task of task serial number 2 is 7FFFFFFF, which is convenient to read the data of the task block corresponding to the processing task of task serial number 2.

It should be understood that the configuration register specifications shown in Table 3 are only illustrative, as long as there is no conflict in memory addresses between different processing tasks, they can be flexibly adjusted and the data start addresses of different processing tasks can be customized by the user. In addition, the data start addresses of different processing tasks can be configured to be continuous or non-consecutive, or both. In addition, in Table 3, the data start address is divided into two parts, the lower 4 bytes and the upper 4 bytes, which are respectively stored in two records. According to actual needs, the data start address can also be divided into more parts, for example, divided into three parts with 4 bytes each, and the complete data start address can be obtained by splicing each part. In Table 3, only the data start addresses with the task serial numbers of 1, 2, and 3 are exemplarily shown, and the task address configuration register 350 may include records corresponding to any number of processing tasks. For example, the task address configuration register 350 can be expanded on the basis of Table 3 so that the task source data start address configuration register specification corresponding to the task distribution section, the task intermediate result data start address configuration register specification corresponding to the intermediate result section, and the task final result data start address configuration register specification corresponding to the final result section each includes 32 records, of which each two records are in pairs and record the lower 4 bytes and upper 4 bytes of the data start address of the same processing task, thus corresponding to 16 processing tasks. In addition, for the data interaction between the serial subsystem 310 and the parallel subsystem 320, the configuration method in the task address configuration register 350 needs to be agreed in advance, and the configuration should be done before starting the calculation, so that the task address configuration register 350 can according to the previously agreed configuration method be used to obtain the data start address of each processing task for reading and writing operations. In this way, by allowing the serial subsystem 310 and the parallel subsystem 320 use the task address configuration register 350 in the data interaction to obtain the data start address of the processing task, the data interaction between the serial subsystem 310 and the parallel subsystem 320 is simplified, and the records of the task address configuration register 350 can be adjusted to flexibly respond to various complex environments, for example, the records of the task address configuration register 350 may be adjusted according to the processing capabilities and memory changes of the parallel subsystem 320. In this way, when the parallel subsystem 320 is an FPGA or a similar hardware structure, the resource configurable feature of the FPGA can be better utilized, and the records of the task address configuration register 350 can be flexibly adjusted with reference to the resources actually allocated to the parallel subsystem 320 or the processing capabilities of the parallel subsystem 320. For example, when the processing capabilities of the parallel subsystem 320 are strong, the number of records in the task address configuration register 350 and the corresponding number of processing tasks that can be used for parallel computing can be increased; and when the processing capabilities of the parallel subsystem 320 are weak, the number of records in the task address configuration register 350 and the corresponding number of processing tasks that can be used for parallel computing can be reduced, thereby further simplifying the control problem and improving the overall computing performance.

As mentioned above, the data start address of the processing task is obtained through the task address configuration register 350, and the task status register 352 provided by the heterogeneous processing system 300 can be used to obtain the status of the processing task, computing engine operational status, and task processing error. Specifically, the task status register 352 includes multiple records, and each record includes at least the task serial number, the task launch identifier, the computing engine operational status identifier, and the task processing error identifier. The task serial number is used to identify which task the task processing result belongs to, and is consistent with the task serial number used when the task is distributed as mentioned above (for example, the field number of 1 in Table 1). Referring to the above description about task address configuration register 350, different task serial numbers also mean different data start addresses. The task launch identifier is used to indicate whether the task is launched, for example, if it is marked as 1, it means that the task has been launched, and if it is marked as 0, it means that the task is not launched and is in an idle state. Under normal circumstances, the task launch identifier is set to not launched (for example, marked as 0); when the serial subsystem 310 is ready to start the processing task, the serial subsystem 310 sets the task launch identifier to already launched (for example, marked as 1); the parallel subsystem 320 by reading the task status register 352 may learn whether the processing task has been launched and start subsequent operations; when the parallel subsystem 320 completes the processing task calculation, the task launch identifier can be set to not launched (for example, marked as 0). In other words, the parallel subsystem 320 has the permission to clean the task launch identifier in the task status register 352. In addition, the serial subsystem 310 cannot operate on the already launched task, in other words, the serial subsystem 310 will also read the task status register 352 and determine whether the processing task has been launched. If it has been launched, the processing task will not be operated again. The computing engine operational status identifier is used to indicate the operational status of the computing engine corresponding to the processing task under the task serial number. As mentioned above, taking the parallel computing engine 130 of the parallel subsystem 120 shown in FIG. 1 as an example, the parallel computing engine 130 includes multiple secondary computing engines, and one or more of the multiple secondary computing engines can be used for the same processing task. Here, the computing engine operational status identifier in the record of the task status register 352 is used to indicate the overall operational status of one or more secondary computing engines for the processing task. Considering that in practical applications, based on the differences in the degree of task parallelism and the degree of data parallelism, the computing resources allocated by the parallel subsystem 320 to different processing tasks may be different. As such, the computing engine operational status identifier is used to indicate the status of the computing resources allocated to this processing task under the task serial number. In accordance with one or more embodiments, the computing engine operational status identifier can indicate multiple states and assign a specific state value to each state, including: in an idle state (state value 0), analyzing task configuration information (state value 1), reading task source data (status value 2), in real-time calculation (status value 3), writing result data to memory (status value 4), and complete processing task (status value 5). The computing engine operational status identifier marked as idle means that the relevant computing resources are not allocated to any tasks; the computing engine operational status identifier marked as analyzing task configuration information means that it is analyzing the configuration information of the processing task (for example, the multiple fields included in Table 1 above); the computing engine operational status identifier marked as reading task source data means that it is reading the task source data of the processing task (for example, the task source data as indicated by the task source data start address of task serial number 1 shown in Table 3 above); the computing engine operational status identifier marked as real-time calculation means that the calculation is in progress; the computing engine operational status identifier marked as writing result data to memory means it is writing result data to intermediate result section or final result section; the computing engine operational status identifier marked as complete processing task means that it has completed all settlements of the processing task and the result data is ready. It should be understood that the status values of various states of the computing engine operational status identifier can be adjusted according to actual needs, which is not specifically limited here. The task processing error identifier is used to indicate whether the processing task under the task serial number has an error and the error type. Specifically, the task processing error identifier can indicate multiple error types and assign a status value to each error type, including the task has no error (status value 0), the serial subsystem configuration information is in error (status value 1), the data distributed by the serial subsystem is in error (status value 2), the parallel subsystem analyzing configuration information is in error (status value 3), the parallel subsystem reading and writing data is in error (status value 4), and the parallel subsystem calculating is in error (status value 5). The task processing error identifier marked as the task has no errors means that no errors are detected; the task processing error identifier marked as the serial subsystem configuration information in error means that there is an error in the configuration information of the processing task provided by the serial subsystem; the task processing error identifier marked as the data distributed by the serial subsystem in error means that there is an error in the data distributed by the processing task provided by the serial subsystem; the task processing error identifier marked as the parallel subsystem analyzing configuration information in error means that there is an error when the parallel subsystem analyzes the configuration information of the processing task, which may be caused by the problem of the parallel subsystem itself; the task processing error identifier marked as parallel subsystem reading and writing data in error means that there is an error when the parallel subsystem performs data reading and writing operations, which may be caused by the problems of the parallel subsystem itself; the task processing error identifier marked as parallel subsystem calculation in error means that there is an error when the parallel subsystem performs the calculation of the processing task. It should be understood that the status values of various error types of the task processing error identifier can be adjusted according to actual needs, which are not specifically limited here. In accordance with one or more embodiments, the size of the physical memory space occupied by each record of the task status register 352 is 32 bits, of which 8 bits are used to store the task serial number, 8 bits are used to store the task processing error identifier, 8 bits are used to store the task launch identifier, and 8 bits are used to store the computing engine operational status identifier. In this way, by querying a task status register 352, the status of each processing task, the respective operational status of the computing engine used for each processing task, and the respective task processing error of each processing task can be obtained. These states can be used to simplify control and improve the overall computing performance. For example, the parallel subsystem 320 can determine whether to launch a specific processing task by querying the task launch identifier without additionally occupying the operations of the serial subsystem. For another example, the serial subsystem 310 can learn the status of the computing resources used for a specific processing task by querying the computing engine operational status identifier without using the resources of the parallel subsystem 320 during the query, and the serial subsystem 310 can learn whether an error occurs in a specific processing task and the error type by querying the task processing error identifier, without a need to use the resources of the parallel subsystem 320 during the query. In this way, in the data interaction between the serial subsystem 310 and the parallel subsystem 320, including distributing the processing task from the serial subsystem 310 to the parallel subsystem 320 and uploading the result data from the parallel subsystem 320 to the serial subsystem 310, the necessary information can be obtained by querying a task status register 352 so as to make corresponding responses and operations, which is beneficial to improve the data interaction between the serial subsystem 310 and the parallel subsystem 320, simplify the control, and improve the overall computing performance.

As mentioned above, the data start address of the processing task can be obtained through the task address configuration register 350, and the status of the processing task, the computing engine operational status, and the task processing error can be obtained through the task status register 352. Also, the task result register 354 provided by the heterogeneous processing system 300 can be used to obtain the task processing result. Specifically, the task result register 354 includes multiple records, and each record includes at least the task serial number and the task processing result identifier. The task serial number is used to identify the task to which the task processing result belongs, and is consistent with the task serial number used when the task is distributed as mentioned above (for example, the field number of 1 in Table 1). Referring to the above description about task address configuration register 350, different task serial numbers also mean different data start addresses. The task processing result identifier is used to indicate whether the processing task under the task serial number has completed all calculations. Only when all calculations are completed, the task processing result identifier will be marked as completion, for example, marked as 1 to indicate that the calculation is complete; and when all calculations are incomplete, the task processing result identifier will be marked as incomplete, for example, marked as 0 to indicate that the calculation is incomplete. It should be understood that once the task processing result identifier is marked, for example, after it is set to 1, the parallel subsystem 320 will not take the initiative to set the task processing result identifier as incomplete, that is, it will not take the initiative to reset the task processing result identifier from 1 to 0. Instead, the serial subsystem 310 must set the task processing result identifier as incomplete, that is, the serial subsystem 310 has the permission to clear the task processing result identifier in the task result register 354. This enables the task processing result identifier in the record of the task result register 354 to be used to inform the serial subsystem 310 whether the processing task under the task serial number has completed all computations, and the corresponding result data is also ready to be uploaded to the serial subsystem 310. The serial subsystem 310 can set the task processing result identifier as incomplete after reading the corresponding result data, and a feedback based on this may be sent back to the parallel subsystem 320 to start the calculation of a new processing task. In accordance with one or more embodiments, the size of the physical memory space occupied by each record of the task result register 354 is 32 bits, of which 8 bits are used to store the task serial number, 8 bits are used to store the task processing result identifier, and the remaining 16 bits are used for user-defined or agreed-upon content by the parties. In this way, by requiring that the task processing result identifier corresponding to a specific processing task in the task result register 354 can only be set as incomplete by the serial subsystem 310 once it is set to be completed by the parallel subsystem 320, and by requiring that the parallel subsystem 320 may set the task processing result identifier as complete only after all the calculations of the specific processing task are completed and the result data is ready to be uploaded, therefore, it is realized that the serial subsystem 310 can obtain the task processing result of the processing task that has been distributed by querying the task result register 354 (for example, by polling or any suitable query mechanism), and does not need to use the resources of the parallel subsystem 320 during query, thereby being beneficial to improve the data interaction between the serial subsystem 310 and the parallel subsystem 320, simplify the control, and improve the overall computing performance.

It should be understood that the task address configuration register 350, the task status register 352, and the task result register 354 all use the task serial number to distinguish different tasks. Task address configuration register 350 may have multiple records corresponding to the same task serial number, that is, the same task. This is because the data start address of the task may be divided into multiple parts and stored in multiple records. For example, in Table 3, the data start address is divided into two parts, the lower 4 bytes and the upper 4 bytes, which are stored in two records respectively. However, task status register 352 and task result register 354 each have multiple records, each record corresponds to a task serial number. In other words, each processing task corresponds to a record in the task status register 352 and also corresponds to a record in the task result register 354. This means that, for each processing task, the record of the task status register 352 for the state control of the processing task and the record of the task result register 354 for the data interaction (upload of the result data) of the processing task are independent of each other, which is beneficial to make the state control and data interaction of the processing task independent of each other. In addition, in task status register 352 and task result register 354, different records correspond to different processing tasks, and different processing tasks are also assigned different register addresses, thereby avoiding conflicts between different processing tasks.

As mentioned above, the data start address of the processing task is obtained through the task address configuration register 350, the status of the processing task, the computing engine operational status, and the task processing error are obtained through the task status register 352, and the task processing result is obtained through the task result register 354. In this way, in the process of data interaction between the serial subsystem 310 and the parallel subsystem 320, for example, the processing task is distributed from the serial subsystem 310 to the parallel subsystem 320 and the result data is uploaded from the parallel subsystem 320 to the serial subsystem 310, one of the serial subsystem 310 and the parallel subsystem 320, before the operation, at the same time of the operation, or after the operation, may obtain necessary data and information by querying the task address configuration register 350, the task status register 352, and the task result register 354, so that corresponding operation can be performed, and querying these registers does not need to additionally occupy resources of the other one of the serial subsystem 310 and the parallel subsystem 320. For example, the serial subsystem 310 can obtain the task processing result of the processing task that has been distributed by querying the task result register 354 without using the resources of the parallel subsystem 320 during the query. For another example, the serial subsystem 310 can learn whether an error occurs in a specific processing task and the error type by querying the task processing error identifier without using the resources of the parallel subsystem 320 during the query. As mentioned above, various complex computations, especially cyclic computations, recursive computations, and dependent computations with large data volumes, involve control issues in data interaction in application scenarios such as federated learning, privacy-preserving computation, and distributed artificial intelligence, and these control issues are transformed into data-flow-driven problems based on control fields. As such, the original complex control process can be realized through the flexible design of the control fields especially the configuration information, and complicated and changing needs may be satisfied with control fields that are user defined or agreed upon by participants. Therefore, combined with the improvement in the design of the control fields, and allowing one party to query necessary data and information through a variety of registers without occupying additional operations on another party, the data interaction inside the heterogeneous processing system including the serial subsystem and the parallel subsystem is further improved, especially to improve the data transmission problem between multiple processing tasks obtained by expanding the algorithms of federated learning and privacy-preserving computation, thereby avoiding waste of memory resources, waste of processing capabilities, and waste of input and output capabilities, also having benefits of efficient computation, low processing latency, and high memory utilization.

Figure 4:
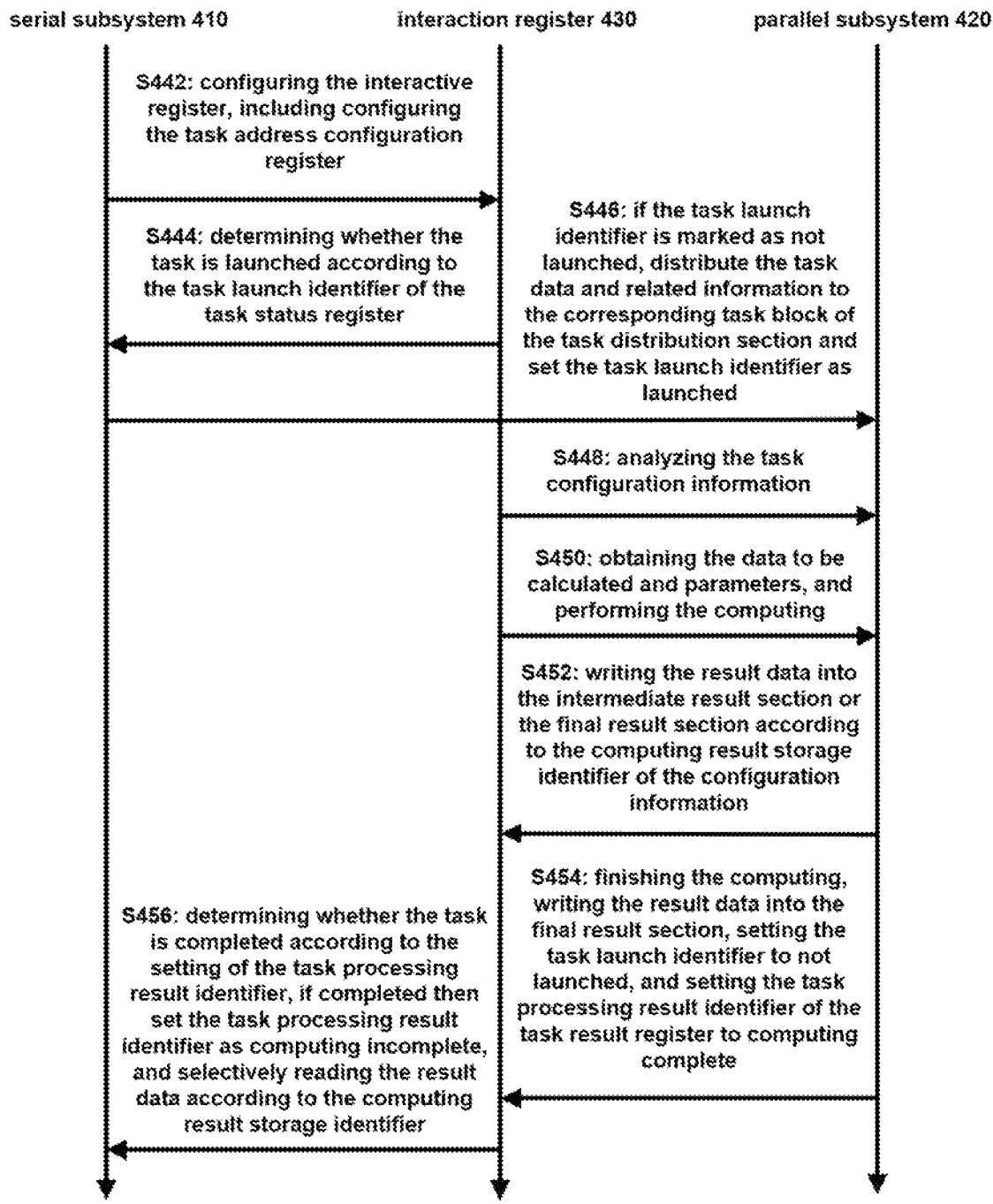
FIG. 4 is a flowchart diagram illustrating the heterogeneous processing system of FIG. 3 performing a processing task in accordance with one or more embodiments of the present disclosure.

Referring to FIG. 4, FIG. 4 is a flowchart diagram illustrating the heterogeneous processing system of FIG. 3 performing a processing task in accordance with one or more embodiments of the present disclosure. As shown in FIG. 4, the heterogeneous processing system includes a serial subsystem 410, a parallel subsystem 420, and an interaction register 430. The structure and function of the serial subsystem 410 are similar to those of the serial subsystem 110 of the heterogeneous processing system 100 shown in FIG. 1, and the structure and functions of the parallel subsystem 420 are similar to those of the parallel subsystem 120 of the heterogeneous processing system 100 shown in FIG. 1. The interaction register 430 includes a task address configuration register, a task status register, and a task result register, which are respectively similar to the task address configuration register 350, the task status register 352, and the task result register 354 shown in FIG. 3, details of which will not be repeated here. The following steps are described below with reference to FIG. 4.

S442: configuring the interactive register, including configuring the task address configuration register.

Configuring the interaction register 430 includes configuring the task address configuration register, in other words, performing a writing operation on the register and writing the task source data start address, the task intermediate result data start address, and the task final result data start address, which respectively correspond to the task distribution section, the intermediate result section, and the final result section, into the corresponding configuration register specification or corresponding record. For example, each data start address of the processing task having a task serial number of 1 is written into respective register addresses shown in Table 1, so as to bring benefits to subsequent data interaction and enables that in the following steps the data start addresses of each processing task may be obtained from the task address configuration register and used for reading and writing operations according to the pre-agreed configuration method.

S444: determining whether the task is launched according to the task launch identifier of the task status register.

The task status register includes multiple records, and the record corresponding to this processing task includes a task launch identifier to indicate whether the task is launched. As mentioned above, the serial subsystem cannot operate on a task that has already been launched, in other words, the serial subsystem determines whether the processing task has been launched according to the task launch identifier of the task status register. If it has been launched, it will not operate the processing task again.

S446: if the task launch identifier is marked as not launched, distribute the task data and related information to the corresponding task block of the task distribution section and set the task launch identifier as launched.

If the task launch identifier is marked as not launched, the serial subsystem distributes the task data and related information to the corresponding task block of the task distribution section and sets the task launch identifier as launched. The serial subsystem can send the task launch command to the parallel subsystem so that the parallel subsystem begins subsequent operations, or the parallel subsystem can learn whether the task has been launched by querying the task launch identifier of the task status register and begin subsequent operations.

S448: analyzing the task configuration information.

The parallel subsystem learns that the task has been launched and starts subsequent operations, and first analyzes the configuration information of the processing task, i.e., the control fields. As mentioned above, the configuration information includes at least the number of operands of the computing mode corresponding to the processing task and the respective source identifier and data address information of each operand. The parallel subsystem can determine whether the required operand comes from the distributed data or from the intermediate result section according to the configuration information, and can also determine whether the result of the processing task is stored in the intermediate result section or the final result section according to the configuration information. When the source identifier of a particular operand identifies that the operand comes from the data distributed by the serial subsystem, the operand can be obtained from the data sub-block of the corresponding task block of the task distribution section through the data address information of the operand; and when the source identifier of a particular operand identifies that the operand comes from the intermediate result section of the parallel subsystem memory, the operand can be obtained from the result data sub-block of the corresponding task block of the intermediate result section through the data address information of the operand. Specifically, data transfer between different processing tasks is realized by providing configuration information including necessary control fields, including writing the result of a particular processing task into the intermediate result section and reading the input data for a particular processing task from the intermediate result section, so as to avoid the operations of data uploading and distributing. Also, based on the configuration information that is flexibly configurable and customizable, various requirements such as user requirements can be integrated into the data stream driving method, and, based on the above-mentioned planning of the data width, data length and the size of the physical memory space, the matching between different sections is realized, which is beneficial to improve the overall computing performance.

S450: obtaining the data to be calculated and parameters, and performing the computing.

After the configuration information of the processing task is analyzed, the data to be calculated, i.e., the operand and the parameters can be obtained according to the configuration information, and the computing can be performed. As mentioned above, the parallel subsystem can determine whether the required operand comes from the data distributed or from the intermediate result section according to the configuration information. Moreover, according to the requirements of the processing task, the parallel subsystem can send the data to be calculated and parameters to the parallel computing engine for computing through, for example, the task management module, and parallel processing can be performed by one or more secondary computing engines in the parallel computing engine.

S452: writing the result data into the intermediate result section or the final result section according to the computing result storage identifier of the configuration information.

The parallel subsystem can determine whether the result of this processing task is stored in the intermediate result section or in the final result section according to the configuration information. Specifically, the configuration information may also include a computing result storage identifier, which is used to identify that the result of the processing task is stored in the intermediate result section or the final result section. For example, the input data for the computing mode corresponding to formula (6) and respective processing task come from the results of the computing mode corresponding to formula (5) and respective processing task. The computing result storage identifier of the configuration information of the task block corresponding to the processing task of formula (5) can be set to indicate that the result of the processing task is stored in the intermediate result section, so that the parallel subsystem will store the result of the processing task in the intermediate result section based on the computing result storage identifier, thereby beneficial to subsequent processing. When the computing result storage identifier identifies that the result of the processing task is stored in the final result section, it means that the result of the processing task will not be used for subsequent processing tasks.

S454: finishing the computing, writing the result data into the final result section, setting the task launch identifier to not launched, and setting the task processing result identifier of the task result register to computing complete.

Above steps S450 and S452 complete one computing. Multiple input data in the same batch belong to the same processing task and the corresponding computing mode, and the same parameters are also applied. It is only necessary to change the operand each time new input data is used, that is, to read new data to be calculated. Therefore, steps S450 and S452 can be performed multiple times until the calculation of multiple input data of the same batch is completed, and then the computing of the processing task can be completed. As mentioned above, any suitable address distribution method can be used to arrange the data address information of the operands of different input data. For example, a simple calculation is performed on the basis of the reading operation of each operand corresponding to the first input data, thereby completing the reading operation of each operand corresponding to the second input data. When the calculation of multiple input data of the same batch is completed, the parallel subsystem has a completion of computing, which means that the processing task ends. When the parallel subsystem completes the computing of the processing task, the task launch identifier can be set to not launched, and the parallel subsystem writes the result data to the final result section and sets the task processing result identifier of the task result register to computing complete. The task processing result identifier of the task result register is used to indicate whether this processing task has completed all calculations. The task processing result identifier will mark completion only when all calculations are complete. Once the task processing result identifier is marked, the parallel subsystem will not take the initiative to set the task processing result identifier to incomplete, but it must be the serial subsystem that sets the task processing result identifier to incomplete. This allows the task processing result identifier in the record of the task result register to be used to inform the serial subsystem whether this processing task has completed all calculations, and the corresponding result data is also ready to be uploaded to the serial subsystem. Therefore, after a completion of computing, the parallel subsystem sets the task launch identifier to not launched and also sets the task processing result identifier of the task result register to computing complete.

S456: determining whether the task is completed according to the setting of the task processing result identifier, if completed then set the task processing result identifier as computing incomplete, and selectively reading the result data according to the computing result storage identifier.

In accordance with one or more embodiments, after the serial subsystem distributes the task data and related information to the corresponding task block of the task distribution section and sets the task launch identifier to launched in step S446, the serial subsystem can utilize the polling or other appropriate query method to query whether the task launch identifier has changed, that is, whether the task launch identifier is not launched. Once it is detected that the task launch identifier is not launched, the serial subsystem can then query whether the task processing result identifier is computing completed, and if the task processing result identifier is computing completed, the task is determined to be completed. Then the serial subsystem sets the task processing result identifier to be computing incomplete, and selectively reads the result data according to the computing result storage identifier. In another possible implementation, the serial subsystem distributes the task data and related information to the corresponding task block of the task distribution section and sets the task launch identifier to launched in step S446, and the serial subsystem can also sets the task processing result identifier to computing incomplete in step S446, such that the serial subsystem can query whether the task processing result identifier has changed through polling or other suitable query methods, that is, whether the task processing result identifier is computing complete. In sum, the serial subsystem initiates the entire processing task process in step S446 (before this needs to finish necessary configuring operation of interaction register especially the task address configuration register in step S442), and at the time of initiating may set the task launch identifier to launched and set the task processing result identifier of the task result register to computing incomplete. In this way, the parallel subsystem can set the task launch identifier to not launched and also set the task processing result identifier of the task result register in step S454 only after the computing is completed. As such, the serial subsystem can learn whether the task is completed by monitoring the task launch identifier and the task processing result identifier, or the serial subsystem can learn whether the task is completed by monitoring only the task processing result identifier.

Still referring to step S456, setting the task processing result identifier as computing incomplete may occur before or after or at the same time as the result data is being read. In addition, selectively reading the result data according to the computing result storage identifier means that the serial subsystem can learn that the result of the processing task is stored in the intermediate result section according to the computing result storage identifier, which means that the result of the processing task may be used for other processing tasks, so the serial subsystem does not need to perform data reading operations, thereby reducing latency and saving resources. Therefore, it is not necessary for the serial subsystem to perform data reading operations after each task is completed, instead it can selectively read the result data according to the computing result storage identifier. Even if the computing result storage identifier indicates that the result of the processing task is stored in the intermediate result section, so the serial subsystem does not need to perform data reading operations, the serial subsystem still sets the task processing result identifier to incomplete, which means that the related task block may be reused for distributing and processing new tasks. The computing result storage identifier represents the control operation applied to the result of a particular processing task as a whole. Through the computing result storage identifier included in the configuration information, the results of individual processing tasks can be selectively written into the intermediate result section, which facilitates subsequent processing tasks to read from the intermediate result section and saves the data reading operation of the serial subsystem.

Above Table 2 illustrates how to deal with the problem of data transmission between different processing tasks, in which processing task 1 and processing task 2 are exemplarily provided. Processing task 1 involves two operands, both of which come from the distributed data, and the result of processing task 1 is stored in the intermediate result section; processing task 2 involves three operands, of which the first and second operands come from the distributed data and the third operand is from the intermediate result section while also being the result of processing task 1. The following describes how the heterogeneous processing system executes the process covering both the processing task 1 and the processing task 2 in Table 2 with reference to the Table 2 and the steps of FIG. 4. For illustrative purposes only, it is assumed that processing task 1 is to perform modular exponentiation operations with the first operand as the power base and the second operand as the power exponent, such as encrypting to obtain ciphertext, where the modulus is a parameter; it is also assumed that processing task 2 is to multiply the first operand with the second operand and then add with the third operand, such as performing an encrypted state operation, where the third operand is the ciphertext obtained by the encryption operation of processing task 1. It should be understood that the problem of data transmission between different processing tasks involves the transmission of data to be calculated or operand, so it can be applied to different computing modes according to actual needs and application scenarios. First, the process of processing task 1 is carried out, which specifically includes: serial subsystem 410 distributes data and related information of processing task 1 to the task block corresponding to processing task 1 in the task distribution section of parallel subsystem 420 (with reference to step S446); the parallel subsystem 420 analyzes the configuration information of processing task 1 (with reference to step S448); the parallel subsystem 420 determines that both operand 1 and operand 2 of processing task 1 are from the distributed data according to the configuration information of processing task 1, and therefore obtains operand 1 and operand 2 of processing task 1 from the task distribution section (with reference to step S450); the parallel subsystem 420 writes the result data into the intermediate result section according to the configuration information of the processing task 1 (with reference to step S452). Then the process of processing task 2 is carried out, which specifically includes: the serial subsystem 410 distributes data and related information of processing task 2 to the task block corresponding to processing task 2 in the task distribution section of parallel subsystem 420 (with reference to step S446); the parallel subsystem 420 analyzes the configuration information of processing task 2 (with reference to step S448); the parallel subsystem 420 determines that both operand 1 and operand 2 of processing task 2 are from the distributed data according to the configuration information of processing task 2, and therefore obtains operand 1 and operand 2 of processing task 2 from the task distribution section, and determines that operand 3 of processing task 2 comes from the intermediate result section. Therefore, the operand 3 of processing task 2 is obtained from the intermediate result section. In other words, the data flow of processing task 2 needs to read both the task source data from the task distribution section and the task intermediate result data from the intermediate result section (with reference to step S450); the parallel subsystem 420 writes the result data into the final result section according to the configuration information of the processing task 2 (with reference to step S452). In this way, by adding the control fields to the data stream, that is, relying only on the respective configuration information of processing task 1 and processing task 2, the data transmission between processing task 1 and processing task 2 is realized, thereby improving the data interaction within the heterogeneous processing system that includes the serial subsystem and the parallel subsystem, having advantages of efficient computing, low processing latency, and high memory utilization.

Referring to FIG. 1 to FIG. 4, especially with reference to the various steps shown in FIG. 4, it should be understood that the interaction register or the task address configuration register, the task status register and the task result register, are all configured to be accessible through direct memory access (DMA), and DMA does not require traditional processor operations such as involvement of CPU cores. The improvement in the memory of the parallel subsystem and the design of the configuration information, that is, the control fields, mentioned in one or more embodiments of the present disclosure make it possible to realize the original complex control flow through the data-flow-driven way, and that control fields and other information may be obtained by directing accessing each register through DMA, thereby providing a very efficient task processing mechanism of the heterogeneous processing system. Moreover, in similar application scenarios such as cyclic computations, recursive computations, and dependent computations with large data volumes, it is necessary to perform multiple iterative computations on the iterative computation parts composed of several steps, and these iterative computation parts can also be expanded into loop operations composed of several computing modes with specific iteration termination conditions. As mentioned above, the original complex control process can be realized through the flexible design of the control fields, especially the configuration information, including the problem of data transmission between different processing tasks. Therefore, for the loop operations obtained by expanding the iterative computation parts, one needs only to design corresponding control fields such that the data that needs to be recycled after the end of the previous cycle is used as intermediate result data as well as input data for the next cycle, or one may achieve more complicated control over the cyclic process through the configuration information, i.e., the control fields, according to actual needs.

Referring to FIG. 1 to FIG. 4, and with reference to Table 1, Table 2, and Table 3, the heterogeneous processing system and various mechanisms provided in one or more embodiments of the present disclosure improve overall computing performance and multitasking efficiency in at least three aspects. Regarding the first aspect, it is to improve the data interaction between serial subsystems such as CPU and parallel subsystems such as FPGA, especially to greatly save the operations of uploading data to the serial subsystem and then distributing to the parallel subsystem, thereby improving the speed and efficiency of data uploading and downloading. Regarding the second aspect, it is to improve the data transmission efficiency between different processing tasks, including the mechanism of task request, response and mutual response. For example, based on the configuration information, i.e., the control fields, that is flexibly designable, the result of one processing task may be used as input data for another processing task. For another example, based on the division of task sections, specifications of registers, and the data transmission mechanism between processing tasks, task processing efficiency is improved. Regarding the third aspect, it is to improve the efficiency of the parallel subsystem for multi-task computing. For example, by performing section division of the parallel subsystem memory according to a specific method, therefore, it becomes beneficial for the parallel processing of multiple processing tasks, and the highly parallelized parallel computing engine combined with the improvement of the task analysis processing flow achieves efficient multi-task processing. In addition, the heterogeneous processing system and internal mechanism provided by one or more embodiments of the present disclosure further improve data transmission through a high-speed communication interface, such as a PCIE interface with 16 channels, and a DMA method for data uploading and distributing, thereby further improving the data transmission efficiency. And, the heterogeneous processing system and internal mechanism provided by one or more embodiments of the present disclosure, also utilize the task address configuration register to obtain the data start address of the processing task so that the task address configuration can be adjusted by adjusting records of the task address configuration register to flexibly cope with various complex environments. Also, based on the task status register for state control and the task result register for data interaction, the data interaction between serial subsystem and parallel subsystem is further improved, which is beneficial to the realization of cross-platform or Cross-system task processing.

The detailed embodiments provided in the present disclosure can be implemented by any one or a combination of hardware, software, firmware, or solid-state logic circuits, and can be implemented in combination with signal processing, control, and/or dedicated circuits. The equipment(s) or device(s) provided in the detailed embodiments of the present disclosure may include one or more processors (a microprocessor, a controller, a digital signal processor (DSP), an application specific integrated circuit (ASIC), a field programmable gate array (FPGA) and so on), and these processors process various computer-executable instructions to control the operations of the equipment(s) or device(s). The equipment(s) or device(s) provided in the detailed embodiments of the present disclosure may include a system bus or a data transmission system that couples various components together. The system bus may include any one of different bus structures or a combination of different bus structures, such as a memory bus or a memory controller, a peripheral bus, a universal serial bus, and/or a process or a local bus using any of a variety of bus architectures. The equipment(s) or device(s) provided in the detailed embodiments of the present disclosure may be provided separately, may also be a part of the system, or may be a part of other equipment or devices.

The detailed embodiments provided by the present disclosure may include a computer-readable storage medium or a combination with a computer-readable storage medium, such as one or more storage devices capable of providing non-transitory data storage. The computer-readable storage medium/storage device may be configured to store data, programmers and/or instructions, which when executed by the processor of the equipment(s) or device(s) provided in the present disclosure, would allow the equipment(s) or device(s) to implement related operations. The computer-readable storage medium/storage device may include one or more of the following characteristics: volatile, nonvolatile, dynamic, static, read/write, read-only, random access, sequential access, location addressability, file addressability and content addressability. In one or more exemplary embodiments, the computer-readable storage medium/storage device may be integrated into the equipment(s) or device(s) provided in the detailed embodiments of the present disclosure or belong to a public system. The computer-readable storage media/storage devices can include optical storage devices, semiconductor storage devices and/or magnetic storage devices, etc., and can also include random access memory (RAM), flash memory, read-only memory (ROM), erasable and programmable read-only memory (EPROM), electrically erasable programmable read-only memory (EEPROM), registers, hard disk, removable disk, recordable and/or rewritable compact disc (CD), digital versatile disc (DVD), large capacity storage medium device or any other form of suitable storage medium.

It will be appreciated that various of the above-disclosed embodiments and other features and functions, or alternatives or varieties thereof, may be desirably combined into many other different systems or applications. Also, various presently unforeseen or unanticipated alternatives, modifications, variations or improvements therein may be subsequently made by those skilled in the art which are also intended to be encompassed by the following claims.

The invention claimed is:

1. A heterogeneous processing system, applicable for federated learning and privacy-preserving computation, comprising:
   a serial subsystem, wherein the serial subsystem is configured for determining by querying a task status register whether a task launch identifier corresponding to a processing task indicates that the processing task is launched, if the task launch identifier indicates that the processing task is launched then the serial subsystem is prohibited from performing operations related to the processing task, and if the task launch identifier indicates that the processing task is not launched then the serial subsystem distributes the processing task together with configuration information of the processing task and sets the task launch identifier to indicate that the processing task is launched, the processing task indicating performing an operation corresponding to computing mode on one or more operands, the task status register comprising the task launch identifier corresponding to the processing task for indicating whether the processing task is launched;
   a parallel subsystem, wherein the parallel subsystem is configured for determining by querying the task status register whether the task launch identifier corresponding to the processing task indicates that the processing task is launched, if the task launch identifier indicates that the processing task is launched then the parallel subsystem performs the operation corresponding to the computing mode on the one or more operands so as to obtain result data of the processing task; and
   the task status register,
   wherein, the parallel subsystem is further configured for: based on the configuration information, selectively obtaining at least one operand of the one or more operands from an intermediate result section on the parallel subsystem while obtaining remaining operand(s) of the one or more operands with respect to the at least one operand from the serial subsystem, and performing the operation corresponding to the computing mode on the operands obtained based on the configuration information,
   the parallel subsystem is further configured for: based on the configuration information, selectively writing the result data into the intermediate result section as an operand of another processing task with respect to the processing task, and
   the parallel subsystem is further configured for: based on the configuration information, selectively writing the result data into a final result section on the parallel subsystem such that the result data is uploadable to the serial subsystem.

2. The heterogeneous processing system of claim 1, a memory of the parallel subsystem comprises a task distribution section, the intermediate result section, and the final result section, and the serial subsystem is configured for distributing the processing task and the configuration information to the task distribution section.

3. The heterogeneous processing system of claim 2, the task distribution section, the intermediate result section, and the final result section each comprises a plurality of task blocks respectively,
   wherein a plurality of processing tasks are in one-to-one correspondence with the plurality of task blocks of the task distribution section, the plurality of processing tasks are in one-to-one correspondence with the plurality of task blocks of the intermediate result section, the plurality of processing tasks are in one-to-one correspondence with the plurality of task blocks of the final result section,
   wherein for each processing task of the plurality of processing tasks respectively: the serial subsystem is configured for distributing the processing task and the configuration information of the processing task to the task block of the task distribution section that corresponds to the processing task.

4. The heterogeneous processing system of claim 3, for each processing task of the plurality of processing tasks respectively: the parallel subsystem is further configured for, based on the configuration information of the processing task, selectively obtaining at least one operand of the operands indicated by the processing task from the task block of the intermediate result section that corresponds to the processing task while obtaining remaining operand(s) of the operands indicated by the processing task from the task block of the task distribution section that corresponds to the processing task, and performing the operation corresponding to the computing mode indicated by the processing task on the operands obtained based on the configuration information of the processing task.

5. The heterogeneous processing system of claim 4, for each processing task of the plurality of processing tasks respectively: the parallel subsystem is further configured for, based on the configuration information of the processing task, selectively writing the result data of the processing task into another task block of the intermediate result section as an operand of another processing task with respect to the processing task, the another task block being different from the task block of the intermediate result section that corresponds to the processing task.

6. The heterogeneous processing system of claim 5, for each processing task of the plurality of processing tasks respectively: the parallel subsystem is further configured for, based on the configuration information of the processing task, selectively writing the result data of the processing task into the task block of the final result section that corresponds to the processing task such that the result data of the processing task is uploadable to the serial subsystem.

7. The heterogeneous processing system of claim 3, the task distribution section, the intermediate result section, and the final result section each has a same first configuration parameter and a same second configuration parameter, the first configuration parameter being a maximum physical memory space occupied by a task block, the second configuration parameter being a maximum number of task blocks.

8. The heterogeneous processing system of claim 3, the heterogeneous processing system also comprises:
a task address configuration register, the task address configuration register comprising:
a task source data start address configuration register specification, for identifying the plurality of task blocks of the task distribution section in one-to-one correspondence with the plurality of processing tasks;
a task intermediate result data start address configuration register specification, for identifying the plurality of task blocks of the intermediate result section in one-to-one correspondence with the plurality of processing tasks;
a task final result data start address configuration register specification, for identifying the plurality of task blocks of the final result section in one-to-one correspondence with the plurality of processing tasks.

9. The heterogeneous processing system of claim 8, data interaction between the serial subsystem and the parallel subsystem is based on the task address configuration register, the serial subsystem is configured for, based on the available resources of the parallel subsystem or the processing capabilities of the parallel subsystem, adjusting the task address configuration register.

10. The heterogeneous processing system of claim 3, the task status register comprises a plurality of records, the plurality of records of the task status register are in one-to-one correspondence with the plurality of processing tasks, the serial subsystem and the parallel subsystem each is configured for, based on the plurality of records of the task status register, applying state control to the plurality of processing tasks respectively.

11. The heterogeneous processing system of claim 10, for each processing task of the plurality of processing tasks respectively, the record of the plurality of records of the task status register corresponding to the processing task comprises:
a task launch identifier, for indicating whether the processing task is launched;
a computing engine operational status identifier, for indicating operational status of a computing engine of the parallel subsystem used for the processing task; and
a task processing error identifier, for indicating an error type of the processing task.

12. The heterogeneous processing system of claim 11, the serial subsystem and the parallel subsystem each is configured for, based on the plurality of records of the task status register, applying state control to the plurality of processing tasks respectively, comprising:
for each processing task of the plurality of processing tasks respectively, the serial subsystem by querying the task status register determines whether the task launch identifier of the record of the plurality of records of the task status register corresponding to the processing task indicates that the processing task is launched, if yes then the serial subsystem is prohibited from performing operations related to the processing task;
for each processing task of the plurality of processing tasks respectively, the parallel subsystem by querying the task status register determines whether the task launch identifier of the record of the plurality of records of the task status register corresponding to the processing task indicates that the processing task is launched, if yes then the parallel system is allowed for performing operations related to the processing task.

13. The heterogeneous processing system of claim 3, wherein the heterogeneous processing system also comprises:
a task result register, the task result register comprises a plurality of records, the plurality of records of the task result register are in one-to-one correspondence with the plurality of processing tasks,
wherein, for each processing task of the plurality of processing tasks respectively, the record of the plurality of records of the task result register corresponding to the processing task comprises a task processing result identifier, the task processing result identifier is for indicating whether the processing task has a completion of computing, the task processing result identifier can be adjusted by the parallel subsystem only to the completion of computing, the serial subsystem by querying the task status register determines the processing result of the processing task.

14. The heterogeneous processing system of claim 2, the intermediate result section and the final result section each comprises inspection information respectively for verifying the configuration information distributed to the task distribution section.

15. The heterogeneous processing system of claim 1, the computing mode is one preset computing mode of a plurality of preset computing modes, the plurality of preset computing modes comprising modular exponentiation calculation, modular multiplication calculation, RSA intersection calculation, homomorphic encryption, homomorphic decryption, DH key exchange, encrypted state addition, encrypted state multiplication, encrypted state multiplication and addition, matrix multiplication, encrypted data summation.

16. The heterogeneous processing system of claim 1, the configuration information comprises a plurality of control fields, the plurality of control fields at least comprising an operand count field, an operand source identifier field, and an operand data address information filed,
wherein the parallel subsystem is further configured for:
determining, based on the operand count field, a number of the one or more operands; and
for each operand of the one or more operands respectively, determining based on the operand source identifier field whether the operand is from the intermediate result section, and if yes, then based on the operand data address information filed obtaining the operand from the intermediate result section.

17. The heterogeneous processing system of claim 16, the plurality of control fields also comprise a computing result storage identifier field, wherein the parallel subsystem determines, based on the computing result storage identifier field, the result data is fit for uploadable to the serial system, the plurality of control fields also comprising at least one of: a task serial number field, a computing mode field, a task batch number field, a task batch total count field, a parameter number field, a parameter width field, an operand width field, an operand data total length field.

18. The heterogeneous processing system of claim 16, the plurality of control fields also comprise a user-customized field, the user-customized field is for adjusting data interaction between the serial subsystem and the parallel subsystem.

19. A heterogeneous processing system, comprising:
a central processing unit (CPU), wherein the CPU is configured for distributing a plurality of processing tasks together with configuration information of each of the plurality of processing tasks respectively, each of the plurality of processing tasks indicating performing an operation corresponding to computing mode on one or more operands;
a field programmable gate array (FPGA), wherein the FPGA comprises a parallel computing engine, the parallel computing engine comprises a plurality of secondary computing engine in parallel, the FPGA is configured for using the parallel computing engine to perform parallel computing for the plurality of processing tasks; and
a task status register, the task status register comprises a plurality of records, the plurality of records of the task status register are in one-to-one correspondence with the plurality of processing tasks, the CPU and the FPGA each is configured for, based on the plurality of records of the task status register, applying state control to the plurality of processing tasks respectively,
wherein, the FPGA comprises a task distribution section, an intermediate result section, and a final result section, wherein the task distribution section, the intermediate result section, and the final result section each comprises a plurality of task blocks that are in one-to-one correspondence with the plurality of processing tasks respectively,
for each processing task of the plurality of processing tasks respectively:
the record of the plurality of records of the task status register corresponding to the processing task comprises a task launch identifier, for indicating whether the processing task is launched,
the CPU is configured for, determining by querying the task status register whether the task launch identifier of the record of the plurality of records of the task status register corresponding to the processing task indicates that the processing task is launched, if the task launch identifier indicates that the processing task is launched then the CPU is prohibited from performing operations related to the processing task, and if the task launch identifier indicates that the processing task is not launched then the CPU distributes the processing task together with configuration information of the processing task to the task block of the task distribution section corresponding to the process task and sets the task launch identifier of the record of the plurality of records of the task status register to indicate that the processing task is launched, the FPGA is configured for, determining by querying the task status register whether the task launch identifier of the record of the plurality of records of the task status register corresponding to the processing task indicates that the processing task is launched, if the task launch identifier indicates that the processing task is launched then the FPGA is further configured for, based on the configuration information of the processing task, selectively obtaining at least one operand of the operands indicated by the processing task from the task block of the intermediate result section that corresponds to the processing task while obtaining remaining operand(s) of the operands indicated by the processing task from the task block of the task distribution section that corresponds to the processing task, and performing the operation corresponding to the processing task on the operands obtained based on the configuration information of the processing task,
for each processing task of the plurality of processing tasks respectively, the FPGA is further configured for, based on the configuration information of the processing task, selectively writing the result data of the processing task as an operand of another processing task with respect to the processing task into another task block different from the task block of the intermediate result section corresponding to the processing task, and
for each processing task of the plurality of processing tasks respectively, the FPGA is further configured for, based on the configuration information of the processing task, selectively writing the result data of the processing task into the task block of the final result section corresponding to the processing task such that the result data of the processing task is uploadable to the CPU.

20. The heterogeneous processing system of claim 19, the configuration information of each processing task of the plurality of processing tasks comprises a plurality of control fields, for each processing task of the plurality of processing tasks respectively, the plurality of control fields of the configuration information of the processing task at least comprises an operand count field, an operand source identifier field, and an operand data address information filed,
wherein the FPGA is further configured for:
determining, based on the operand count field, a number of the operands indicated by the processing task; and
for each operand of the operands indicated by the processing task respectively, determining based on the operand source identifier field whether the operand is from the intermediate result section, and if yes, then based on the operand data address information filed obtaining the operand from the intermediate result section.

21. The heterogeneous processing system of claim 19, the intermediate result section and the final result section each comprises inspection information respectively for verifying the configuration information of each processing task of the plurality of processing tasks distributed to the task distribution section.

22. The heterogeneous processing system of claim 19, the heterogeneous processing system also comprises:
a task address configuration register, the task address configuration register comprising:
a task source data start address configuration register specification, for identifying the plurality of task blocks of the task distribution section in one-to-one correspondence with the plurality of processing tasks;

a task intermediate result data start address configuration register specification, for identifying the plurality of task blocks of the intermediate result section in one-to-one correspondence with the plurality of processing tasks; and a task final result data start address configuration register specification, for identifying the plurality of task blocks of the final result section in one-to-one correspondence with the plurality of processing tasks.

23. The heterogeneous processing system of claim 22, data interaction between the CPU and the FPGA is based on the task address configuration register, the CPU is configured for, based on the available resources of the FPGA or the processing capabilities of the FPGA, adjusting the task address configuration register.

24. The heterogeneous processing system of claim 19, for each processing task of the plurality of processing tasks respectively, the record of the plurality of records of the task status register corresponding to the processing task comprises:

a computing engine operational status identifier, for indicating operational status of a secondary computing engine of the FPGA used for the processing task; and a task processing error identifier, for indicating an error type of the processing task.

25. The heterogeneous processing system of claim 19, wherein the heterogeneous processing system also comprises:

a task result register, the task result register comprises a plurality of records, the plurality of records of the task result register are in one-to-one correspondence with the plurality of processing tasks, wherein, for each processing task of the plurality of processing tasks respectively, the record of the plurality of records of the task result register corresponding to the processing task comprises a task processing result identifier, the task processing result identifier is for indicating whether the processing task has a completion of computing, the task processing result identifier can be adjusted by the FPGA only to the completion of computing, the CPU by querying the task status register determines the processing result of the processing task.

26. A heterogeneous processing system, applicable for federated learning and privacy-preserving computation, comprising:

a serial subsystem, wherein the serial subsystem is configured for determining by querying a task status register whether a task launch identifier corresponding to a processing task indicates that the processing task is launched, if the task launch identifier indicates that the processing task is launched then the serial subsystem is prohibited from performing operations related to the processing task, and if the task launch identifier indicates that the processing task is not launched then the serial subsystem distributes the processing task together with configuration information of the processing task and sets the task launch identifier to indicate that the processing task is launched, the processing task indicating performing an operation corresponding to computing mode on one or more operands, the task status register comprising the task launch identifier corresponding to the processing task for indicating whether the processing task is launched;

a parallel subsystem, wherein the parallel subsystem is configured for determining by querying the task status register whether the task launch identifier corresponding to the processing task indicates that the processing task is launched, if the task launch identifier indicates that the processing task is launched then the parallel subsystem performs the operation corresponding to the computing mode on the one or more operands so as to obtain result data of the processing task; and the task status register, wherein, the parallel subsystem is further configured for: based on the configuration information, selectively obtaining at least one operand of the one or more operands from an intermediate result section on the parallel subsystem while obtaining remaining operand(s) of the one or more operands with respect to the at least one operand from the serial subsystem, and performing the operation corresponding to the computing mode on the operands obtained based on the configuration information, wherein the configuration information comprises a plurality of control fields, the plurality of control fields at least comprising an operand count field, an operand source identifier field, and an operand data address information filed, wherein the parallel subsystem is further configured for: determining, based on the operand count field, a number of the one or more operands; and for each operand of the one or more operands respectively, determining based on the operand source identifier field whether the operand is from the intermediate result section, and if yes, then based on the operand data address information filed obtaining the operand from the intermediate result section.

27. The heterogeneous processing system of claim 26, the plurality of control fields also comprise a computing result storage identifier field, wherein the parallel subsystem determines, based on the computing result storage identifier field, the result data is fit for uploadable to the serial system, the plurality of control fields also comprising at least one of: a task serial number field, a computing mode field, a task batch number field, a task batch total count field, a parameter number field, a parameter width field, an operand width field, an operand data total length field.

28. The heterogeneous processing system of claim 26, the plurality of control fields also comprise a user-customized field, the user-customized field is for adjusting data interaction between the serial subsystem and the parallel subsystem.

* * * * *